United States Patent
Li et al.

(10) Patent No.: US 12,302,314 B2
(45) Date of Patent: May 13, 2025

(54) SUB-BAND SPECIFIC SOUNDING REFERENCE SIGNAL RESOURCE INDICATOR INDICATION FOR NON-CODEBOOK BASED FREQUENCY-SELECTIVE UPLINK PRECODING

(71) Applicant: QUALCOMM Incorporated, San Diego, CA (US)

(72) Inventors: Qiaoyu Li, Beijing (CN); Yu Zhang, San Diego, CA (US); Chao Wei, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 17/597,909

(22) PCT Filed: Aug. 6, 2020

(86) PCT No.: PCT/CN2020/107338
§ 371 (c)(1),
(2) Date: Jan. 28, 2022

(87) PCT Pub. No.: WO2021/027670
PCT Pub. Date: Feb. 18, 2021

(65) Prior Publication Data
US 2022/0248431 A1 Aug. 4, 2022

(51) Int. Cl.
*H04W 72/12* (2023.01)
*H04L 5/00* (2006.01)
(Continued)

(52) U.S. Cl.
CPC ....... *H04W 72/1268* (2013.01); *H04L 5/0051* (2013.01); *H04W 72/20* (2023.01)

(58) Field of Classification Search
CPC .............. H04W 72/1268; H04W 72/20; H04L 5/0051; H04L 5/0094; H04L 5/0016; H04L 5/0044
See application file for complete search history.

(56) References Cited

U.S. PATENT DOCUMENTS

2014/0112168 A1  4/2014  Chen et al.
2020/0022176 A1* 1/2020  Osawa ............... H04L 27/2646
(Continued)

FOREIGN PATENT DOCUMENTS

CA  3078329 A1  4/2019
CA  3064481 A1  7/2019
(Continued)

OTHER PUBLICATIONS

U.S. Appl. No. 62/877,112 (Year: 2019).*
(Continued)

*Primary Examiner* — Kiet Tang
(74) *Attorney, Agent, or Firm* — QUALCOMM Incorporated

(57) ABSTRACT

Various aspects of the present disclosure generally relate to wireless communication. In some aspects, a user equipment may receive a sub-band specific sounding reference signal (SRS) resource indicator identifying subsets of SRS resources, of a set of SRS resources, associated with precoding a physical uplink shared channel (PUSCH) communication that is to be transmitted in a PUSCH resource. The user equipment may precode the PUSCH communication based at least in part on the sub-band specific SRS resource indicator. The user equipment may transmit the PUSCH communication after precoding the PUSCH communication based at least in part on the sub-band specific SRS resource indicator. Numerous other aspects are provided.

24 Claims, 20 Drawing Sheets

(51) Int. Cl.
*H04W 72/1268* (2023.01)
*H04W 72/20* (2023.01)

(56) References Cited

U.S. PATENT DOCUMENTS

| | | | | |
|---|---|---|---|---|
| 2020/0067663 | A1* | 2/2020 | Liu | H04W 72/1268 |
| 2020/0119783 | A1 | 4/2020 | Liu et al. | |
| 2021/0105090 | A1 | 4/2021 | Park et al. | |
| 2022/0200757 | A1* | 6/2022 | Guo | H04L 5/0044 |

FOREIGN PATENT DOCUMENTS

| | | |
|---|---|---|
| CN | 106455094 A | 2/2017 |
| CN | 108809578 A | 11/2018 |
| CN | 109150471 A | 1/2019 |
| CN | 109565311 A | 4/2019 |
| WO | 2018128296 A1 | 7/2018 |
| WO | 2018194363 A1 | 10/2018 |
| WO | 2018202096 A1 | 11/2018 |
| WO | 2019098935 A1 | 5/2019 |
| WO | 2019136723 A1 | 7/2019 |

OTHER PUBLICATIONS

Ad-Hoc Chair (Samsung): "Chairman's Notes of AI 7.1.2 Maintenance for MIMO", 3GPP TSG RAN WG 1 Meeting #94, R1-1809913, Aug. 24, 2018(Aug. 24, 2018), 40 pages, the whole document.
CATT: "Discussion on Non-codebook Based UL MIMO Transmission", 3GPP TSG RAN WG1 Meeting #90, R1-1712365, Prague, Czechia, Aug. 21-25, 2017, 3 Pages.
International Search Report and Written Opinion—PCT/CN2019/099945—ISA/EPO—Apr. 24, 2020.
International Search Report and Written Opinion—PCT/CN2020/107338—ISA/EPO—Oct. 27, 2020.
NTT Docomo Inc: "Remaining Issue on UL Non-codebook Based Transmission", 3GPP TSG-RAN WG1 NR Ad-Hoc Meeting, R1-1800658, Vancouver, Canada, Nov. 22-26, 2017, pp. 1-2.
Qualcomm Incorporated: "Non-Codebook Based UL Transmission", 3GPP TSG RAN WG1 #88-bis, R1-1705577, Apr. 7, 2017(Apr. 7, 2017), 7 pages, the whole document.
CATT: "Remaining Issues on Codebook Based UL Transmission", 3GPP TSG RAN WG1 Meeting #92, R1-1801716, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 26, 2018-Mar. 2, 2018, Feb. 17, 2018, 11 Pages, XP051397697, p. 3.
Huawei., et al., "Remaining Details of Non-codebook Based Transmission for UL MIMO", 3GPP TSG RAN WG1 Meeting #91, R1-1719431, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 17, 2017, pp. 1-4, XP051369133, p. 3.
NTT Docomo Inc: "Discussions on NR SRS Design", 3GPP TSG RAN WG1 Meeting 90bis, R1-1718200, 3rd Generation Partnership Project (3GPP), Mobile Competence Centre, 650, Route Des Lucioles, F-06921, Sophia-Antipolis Cedex, France, vol. RAN WG1, No. Prague, CZ, Oct. 9, 2017-Oct. 13, 2017, Oct. 3, 2017, pp. 1-11, XP051352908, p. 10.
Qualcomm Incorporated: "Non-Codebook Based UL Transmission", 3GPP TSG RAN WG1 Meeting #90bis, R1-1718537, 3rd Generation Partnership Project (3GPP), Mobile Competence Centre, 650, Route Des Lucioles, F-06921, Sophia-Antipolis Cedex, France, vol. RAN WG1, No. Prague, Czech, Oct. 9, 2017-Oct. 13, 2017, Oct. 3, 2017, pp. 1-4, XP051353105, p. 1-p. 2.
Supplementary European Search Report—EP20853250—Search Authority—The Hague—Aug. 7, 2023.

* cited by examiner

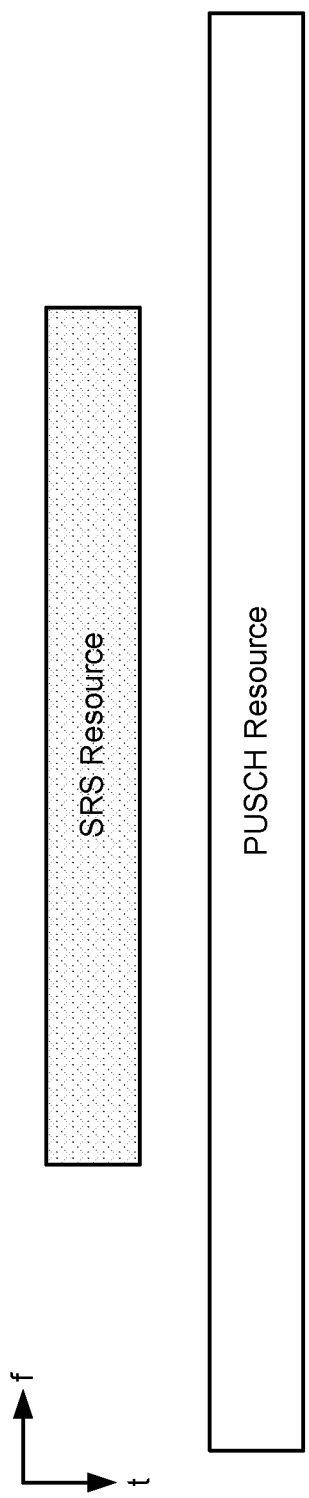
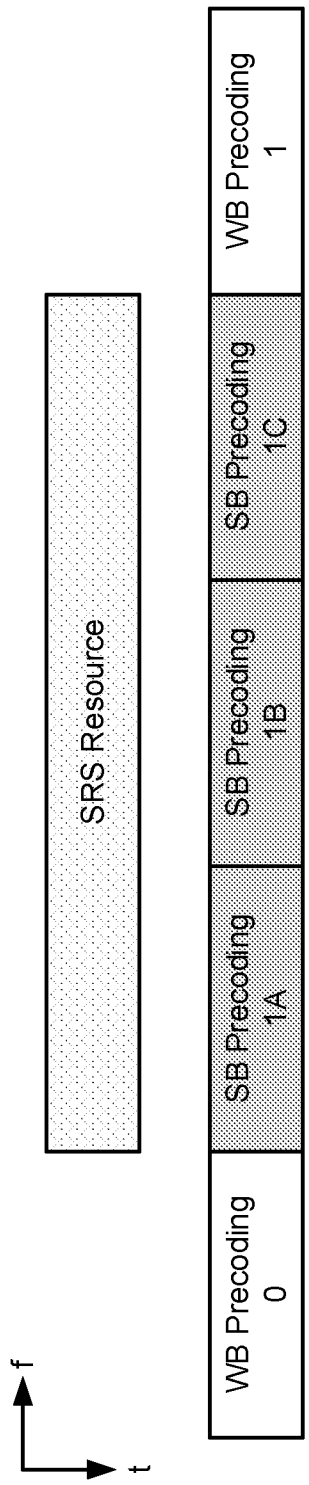
FIGURE 4B
FIGURE 4C

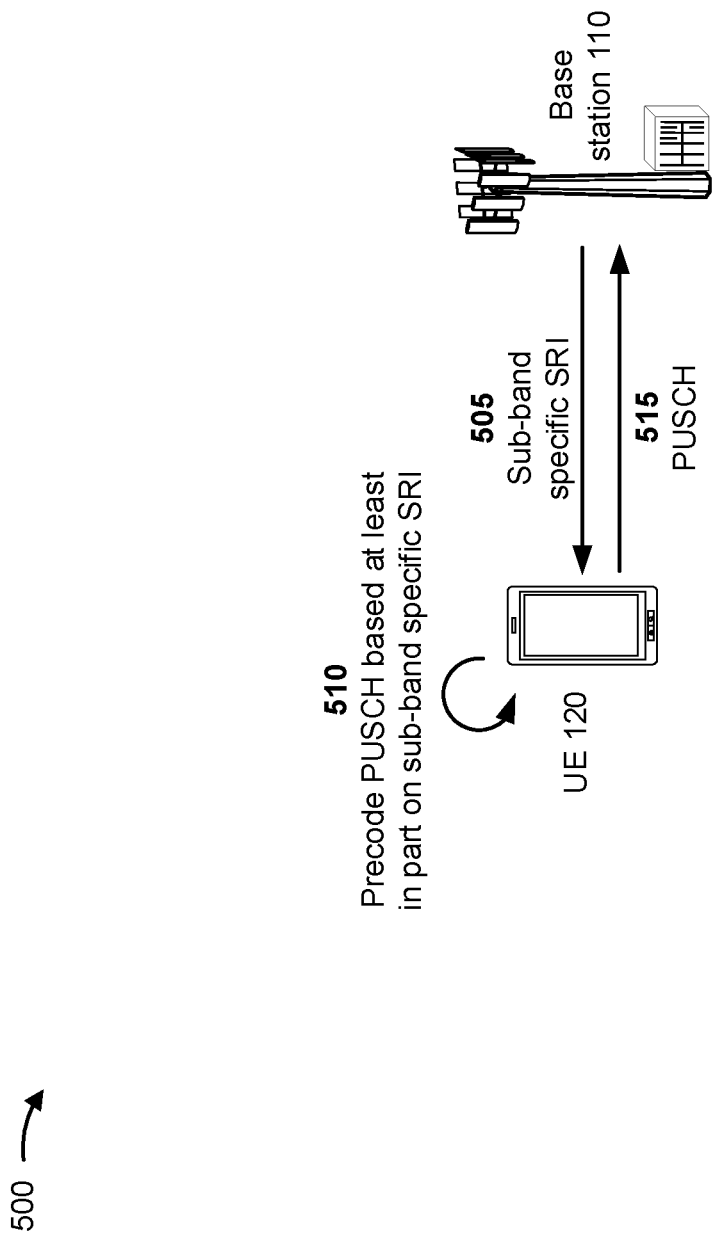

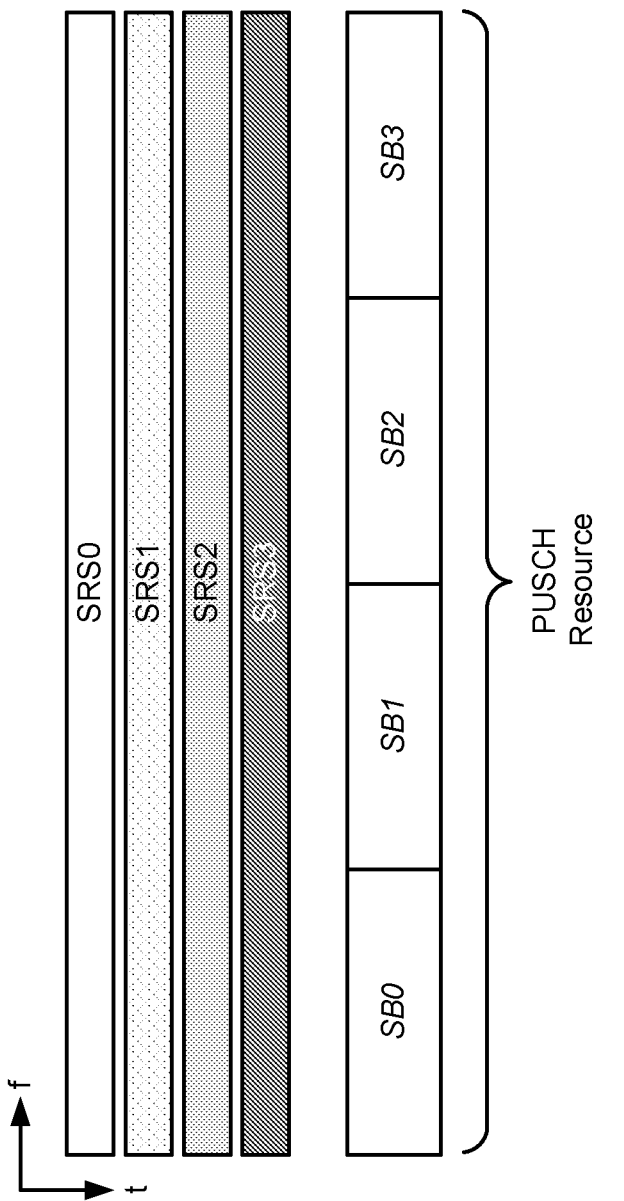

| N_srs=3: WB-SRI = 2 bit, SB-SRI = 1 bit | | | |
|---|---|---|---|
| WB-SRI | 0 | 1 | 2 |
| WB-SRS | | | |
| SB-SRI | 0 | 1 | 0 | 1 | 0 | 1 |
| SB-SRS | 1 | 2 | 0 | 2 | 0 | 1 |

L_max = 1

N_srs=2: WB-SRI = 1 bit, SB-SRI = 1 bit, L_max = 2

| | Rank=1 | | Rank=2 |
|---|---|---|---|
| WB-SRI | 0 | 1 | 1 |
| WB-SRS | 0 | 1 | 0,1 |
| SB-SRI | | | 0 |
| SB-SRS | | | 1 |

N_srs=3: WB-SRI = 3 bit, SB-SRI = 1 bit, L_max = 2

| | Rank=2 | | | | Rank=1 | |
|---|---|---|---|---|---|---|
| WB-SRI | 0 | 1 | 2 | 3 | 4 | 5 |
| WB-SRS | 0 | 1 | 2 | | | |
| SB-SRI | 0 | 0 | 0 | 0 | 0 | 1 |
| | 1 | 2 | 1 | 2 | 1 | 2 |
| SB-SRS | 0 | 0 | 0 | 0 | 0 | 1 |
| | 1 | 2 | 1 | 2 | 1 | 2 |

N_srs=4: WB-SRI = 3 bit, SB-SRI = 2 bit, L_max = 2

| | Rank=2 | | | | | | | Rank=1 | |
|---|---|---|---|---|---|---|---|---|---|
| WB-SRI | 0 | | 1 | | 2 | | 3 | 4 | |
| WB-SRS | 0 | | 1 | | 2 | | 3 | | |
| SB-SRI | 0 1 2 3 | 0 1 2 3 | 0 1 2 3 | 0 1 2 3 | 0 1 2 3 | 0 1 2 3 | 0 1 2 3 | 0 1 2 3 | 0 1 2 3 |
| SB-SRS | 1 2 3 | 2 3 | 0 2 3 | 0 3 | 0 1 3 | 0 1 | 0 1 2 | 1 2 3 | 1 2 3 |

L_max = 3

N_srs=3: WB-SRI = 3 bit, SB-SRI = 1 bit

|  | Rank=1 | | | | Rank=2 | | Rank=3 |
|---|---|---|---|---|---|---|---|
| WB-SRI | 0 | 1 | | 2 | 3 | | |
| WB-SRS | 0 | 1 | | 2 | 0,1 | 1,2 | 0,1,2 |
| SB-SRI | 0 | 1 | 0 | 1 | 0 | 1 | |
| SB-SRS | 1 | 2 | 0 | 2 | 1 | 0 | |

L_max = 3

N_srs=4: WB-SRI = 4 bit, SB-SRI = 2 bit

|  | Rank=1 | | | | Rank=2 | | | Rank=3 | | |
|---|---|---|---|---|---|---|---|---|---|---|
| WB-SRI | 0 | 1 | 2 | 3 | 4 | 5 | 6 | 7 | 8 | |
| WB-SRS | 0 | 1 | 2 | 3 | 0,1 | 2,3 | 0,1,2 | 0,1,3 | 0,2,3 | 1,2,3 |
| SB-SRI | 0,1,2,3 | 0,1,2,3 | 0,1,2,3 | 0,1,2,3 | 0,1,2,3 | 0,1,2,3 | 0,1,2 | 0,1,2 | 0,1,2 | 0,1,2 |
| SB-SRS | 1,2,3,0 | 2,3,0,1 | 3,0,1,2 | 0,1,2,3 | 2,3,0,1 | 0,1,2,3 | 0,1,2 | 0,1,3 | 0,2,3 | 1,2,3 |

FIGURE 6F

L_max = 4

N_srs=4: WB-SRI = 4 bit, SB-SRI = 2 bit

| | Rank=1 | Rank=2 | | | | Rank=3 | | | | Rank=4 |
|---|---|---|---|---|---|---|---|---|---|---|
| WB-SRI | 0 | 1 | 2 | 3 | 4 | 5 | 6 | 7 | 8 | 9 |
| WB-SRS | 0 | 0 | 1 | 2 | 3 | 0 | 1 | 2 | 3 | 0,1,2,3 |
| SB-SRI | 0\|1\|2\|3 | 0\|1\|2\|3 | 0\|1\|2\|3 | 0\|1\|2\|3 | 0\|1\|2\|3 | 0 1 2 | 0 1 2 | 0 1 2 | 0 1 2 | |
| SB-SRS | 0\|1\|2\|3 | 1\|2\|3\|0 | 2\|3\|0\|1 | 3\|0\|1\|2 | 3\|0\|1\|2 | 1, 2, 0, 2 3 3 | 0, 1, 0, 2 3 3 | 0, 1, 0, 1 3 3 | 0, 1, 0, 2 3 | |

FIGURE 6G

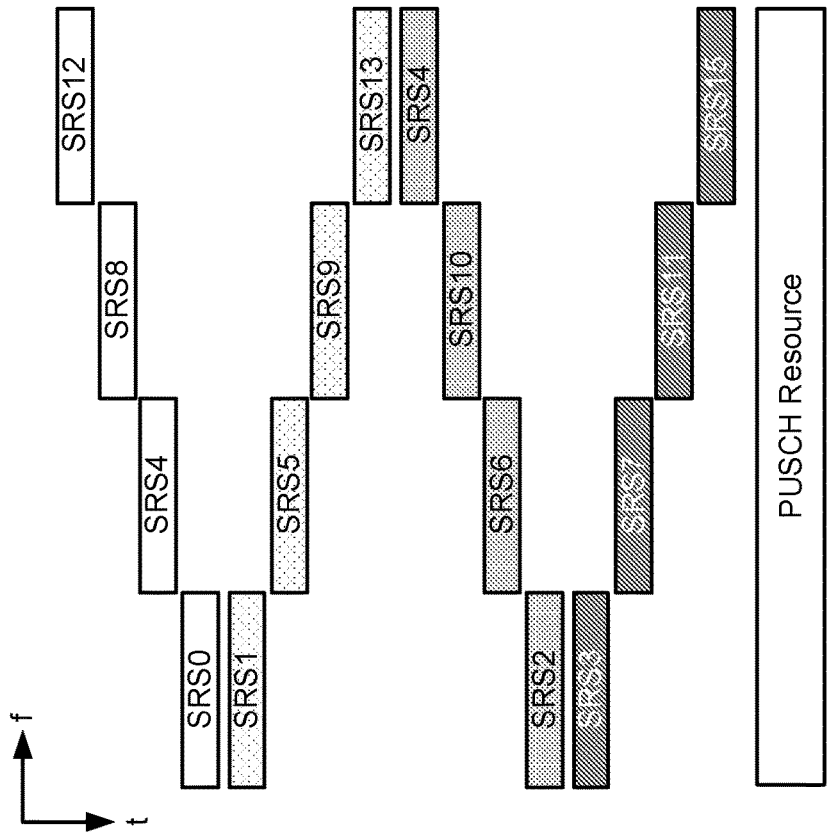
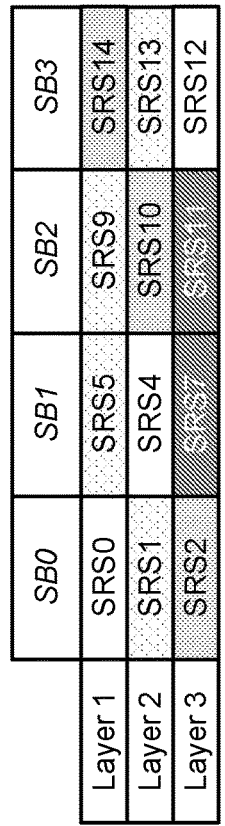
FIGURE 7A
FIGURE 7B

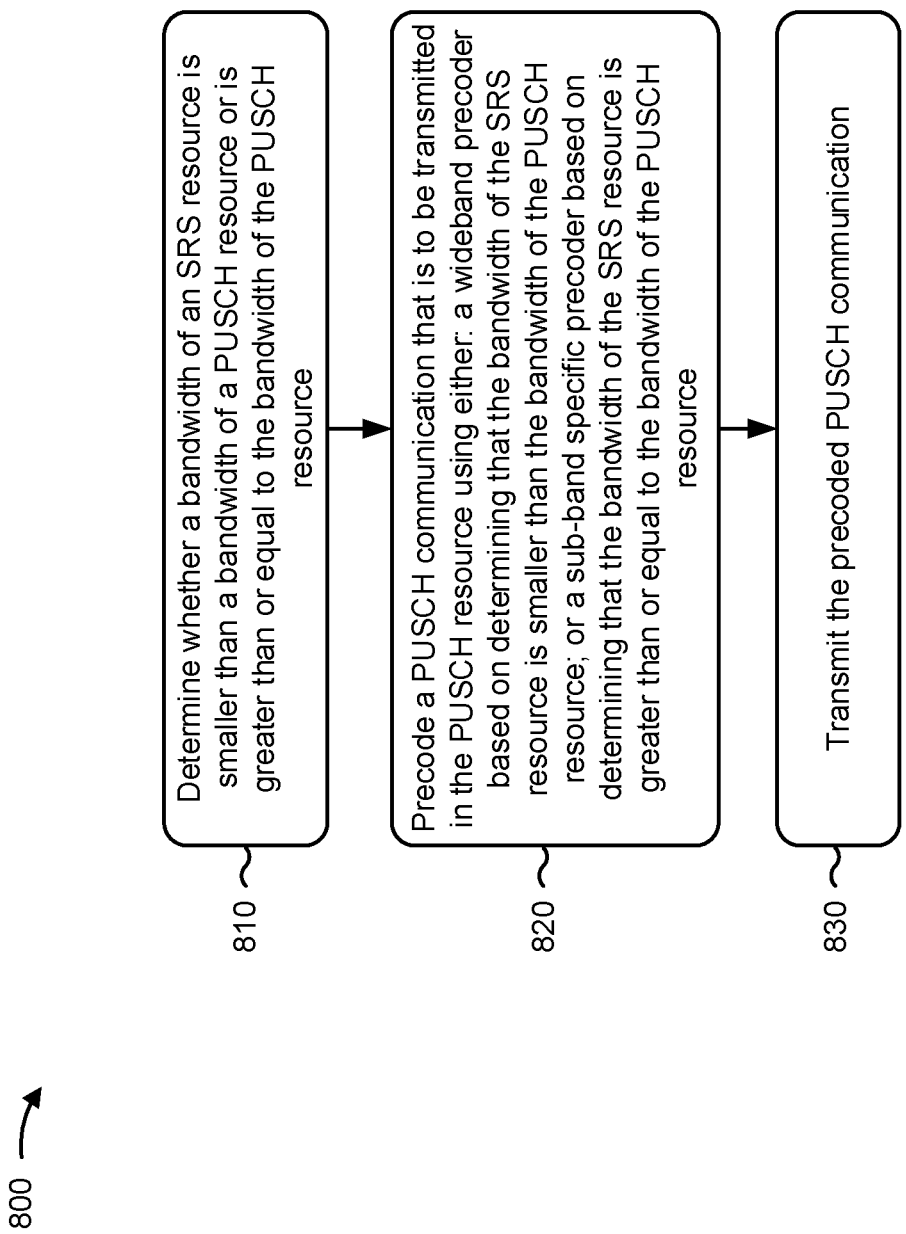

SUB-BAND SPECIFIC SOUNDING REFERENCE SIGNAL RESOURCE INDICATOR INDICATION FOR NON-CODEBOOK BASED FREQUENCY-SELECTIVE UPLINK PRECODING

CROSS-REFERENCE TO RELATED APPLICATIONS

This Application is a 371 National Stage of Patent Cooperation Treaty (PCT) Application No. PCT/CN2020/107338, filed on Aug. 6, 2020, entitled "SUB-BAND SPECIFIC SOUNDING REFERENCE SIGNAL RESOURCE INDICATOR INDICATION FOR NON-CODEBOOK BASED FREQUENCY-SELECTIVE UPLINK PRECODING," which claims priority to Patent Cooperation Treaty (PCT) Application No. PCT/CN2019/099945, filed on Aug. 9, 2019, entitled "SUB-BAND SPECIFIC SOUNDING REFERENCE SIGNAL RESOURCE INDICATOR INDICATION FOR NON-CODEBOOK BASED FREQUENCY-SELECTIVE UPLINK PRECODING," which are hereby incorporated by reference into this Patent Application.

FIELD OF THE DISCLOSURE

Aspects of the present disclosure generally relate to wireless communication and to techniques and apparatuses for sub-band specific sounding reference signal (SRS) resource indicator indication for non-codebook (NCB) based frequency-selective uplink precoding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, among other examples). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, among other examples.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

In some wireless communication systems, non-codebook (NCB)-based frequency-selective uplink precoding may be supported. NCB-based frequency-selective uplink precoding allows a UE to use different NCB-based precoders in different allocated sub-bands of a given frequency band. Here, the UE and the base station should agree on the method that the UE uses to select NCB-based precoders across the allocated frequency resources. In some cases, NCB-based frequency-selective uplink precoding can be carried out as follows: one SRS resource may be made up of multiple SRS frequency hoppings, where different hoppings may be based on different precoders, and the base station indicates a wideband SRI. Here, the UE may implement frequency-selective precoding based on the indicated wideband SRI. One drawback of this technique is that each frequency sub-band uses identical SRS resources. Thus, the base station may not be able to optimize sub-band specific precoders, since the sub-band specific precoders are decided by the UE when transmitting the SRS hoppings. In other words, current implementation of NCB-based frequency-selective uplink precoding does not provide control of the frequency-selective precoder, which may result in significant inter-UE-interference.

SUMMARY

In some aspects, a method of wireless communication, performed by a user equipment, may include determining whether a bandwidth of a sounding reference signal (SRS) resource is smaller than a bandwidth of a physical uplink shared channel (PUSCH) resource or is greater than or equal to the bandwidth of the PUSCH resource. The method may include precoding a PUSCH communication that is to be transmitted in the PUSCH resource using either: a wideband precoder based on determining that the bandwidth of the SRS resource is smaller than the bandwidth of the PUSCH resource, or a sub-band specific precoder based on determining that the bandwidth of the SRS resource is greater than or equal to the bandwidth of the PUSCH resource. The method may include transmitting the precoded PUSCH communication.

In some aspects, a method of wireless communication, performed by a user equipment, may include precoding, using a first precoder, a first portion of a PUSCH communication that is to be transmitted in a portion of a PUSCH resource that overlaps with a bandwidth of an SRS resource. The method may include, using a second precoder, a second portion of the PUSCH communication that is to be transmitted in a portion of the PUSCH resource that does not overlap with the bandwidth of the SRS resource. The method may include transmitting the precoded PUSCH communication.

In some aspects, a method of wireless communication, performed by a user equipment, may include receiving a sub-band specific SRS resource indicator identifying subsets of SRS resources, of a set of SRS resources, associated with precoding a PUSCH communication that is to be transmitted in a PUSCH resource. The method may include precoding the PUSCH communication based at least in part on the sub-band specific SRS resource indicator. The method may include transmitting the precoded PUSCH communication.

In some aspects, a user equipment for wireless communication may include memory and one or more processors operatively coupled to the memory. The memory and the one or more processors may be configured to determine whether a bandwidth of an SRS resource is smaller than a bandwidth of a PUSCH resource or is greater than or equal to the bandwidth of the PUSCH resource. The memory and the one or more processors may be configured to precode a PUSCH communication that is to be transmitted in the PUSCH resource using either: a wideband precoder based on determining that the bandwidth of the SRS resource is smaller than the bandwidth of the PUSCH resource, or a sub-band specific precoder based on determining that the bandwidth of the SRS resource is greater than or equal to the bandwidth of the PUSCH resource. The memory and the one or more processors may be configured to transmit the precoded PUSCH communication.

In some aspects, a user equipment for wireless communication may include memory and one or more processors operatively coupled to the memory. The memory and the one or more processors may be configured to precode, using a first precoder, a first portion of a PUSCH communication that is to be transmitted in a portion of a PUSCH resource that overlaps with a bandwidth of an SRS resource. The memory and the one or more processors may be configured to precode, using a second precoder, a second portion of the PUSCH communication that is to be transmitted in a portion of the PUSCH resource that does not overlap with the bandwidth of the SRS resource. The memory and the one or more processors may be configured to transmit the precoded PUSCH communication.

In some aspects, a user equipment for wireless communication may include memory and one or more processors operatively coupled to the memory. The memory and the one or more processors may be configured to receive a sub-band specific SRS resource indicator identifying subsets of SRS resources, of a set of SRS resources, associated with precoding a PUSCH communication that is to be transmitted in a PUSCH resource. The memory and the one or more processors may be configured to precode the PUSCH communication based at least in part on the sub-band specific SRS resource indicator. The memory and the one or more processors may be configured to transmit the precoded PUSCH communication.

In some aspects, a non-transitory computer-readable medium may store one or more instructions for wireless communication. The one or more instructions, when executed by one or more processors of a user equipment, may cause the one or more processors to determine whether a bandwidth of an SRS resource is smaller than a bandwidth of a PUSCH resource or is greater than or equal to the bandwidth of the PUSCH resource. The one or more instructions, when executed by one or more processors of the user equipment, may cause the one or more processors to precode a PUSCH communication that is to be transmitted in the PUSCH resource using either: a wideband precoder based on determining that the bandwidth of the SRS resource is smaller than the bandwidth of the PUSCH resource, or a sub-band specific precoder based on determining that the bandwidth of the SRS resource is greater than or equal to the bandwidth of the PUSCH resource. The one or more instructions, when executed by one or more processors of the user equipment, may cause the one or more processors to transmit the precoded PUSCH communication.

In some aspects, a non-transitory computer-readable medium may store one or more instructions for wireless communication. The one or more instructions, when executed by one or more processors of a user equipment, may cause the one or more processors to precode, using a first precoder, a first portion of a PUSCH communication that is to be transmitted in a portion of a PUSCH resource that overlaps with a bandwidth of an SRS resource. The one or more instructions, when executed by one or more processors of the user equipment, may cause the one or more processors to precode, using a second precoder, a second portion of the PUSCH communication that is to be transmitted in a portion of the PUSCH resource that does not overlap with the bandwidth of the SRS resource. The one or more instructions, when executed by one or more processors of the user equipment, may cause the one or more processors to transmit the precoded PUSCH communication.

In some aspects, a non-transitory computer-readable medium may store one or more instructions for wireless communication. The one or more instructions, when executed by one or more processors of a user equipment, may cause the one or more processors to receive a sub-band specific SRS resource indicator identifying subsets of SRS resources, of a set of SRS resources, associated with precoding a PUSCH communication that is to be transmitted in a PUSCH resource. The one or more instructions, when executed by one or more processors of the user equipment, may cause the one or more processors to precode the PUSCH communication based at least in part on the sub-band specific SRS resource indicator. The one or more instructions, when executed by one or more processors of the user equipment, may cause the one or more processors to transmit the precoded PUSCH communication.

In some aspects, an apparatus for wireless communication may include means for determining whether a bandwidth of an SRS resource is smaller than a bandwidth of a PUSCH resource or is greater than or equal to the bandwidth of the PUSCH resource. The apparatus may include means for precoding a PUSCH communication that is to be transmitted in the PUSCH resource using either: a wideband precoder based on determining that the bandwidth of the SRS resource is smaller than the bandwidth of the PUSCH resource, or a sub-band specific precoder based on determining that the bandwidth of the SRS resource is greater than or equal to the bandwidth of the PUSCH resource. The apparatus may include means for transmitting the precoded PUSCH communication.

In some aspects, an apparatus for wireless communication may include means for precoding, using a first precoder, a first portion of a PUSCH communication that is to be transmitted in a portion of a PUSCH resource that overlaps with a bandwidth of an SRS resource. The apparatus may include means for precoding, using a second precoder, a second portion of the PUSCH communication that is to be transmitted in a portion of the PUSCH resource that does not overlap with the bandwidth of the SRS resource. The apparatus may include means for transmitting the precoded PUSCH communication.

In some aspects, an apparatus for wireless communication may include means for receiving a sub-band specific SRS resource indicator identifying subsets of SRS resources, of a set of SRS resources, associated with precoding a PUSCH communication that is to be transmitted in a PUSCH resource. The apparatus may include means for precoding the PUSCH communication based at least in part on the sub-band specific SRS resource indicator. The apparatus may include means for transmitting the precoded PUSCH communication.

In some aspects, a method of wireless communication, performed by a base station, may include determining whether a bandwidth of an SRS resource is smaller than a bandwidth of a PUSCH resource or is greater than or equal to the bandwidth of the PUSCH resource. The method may include receiving a PUSCH communication transmitted in the PUSCH resource using either: a wideband precoder based on determining that the bandwidth of the SRS resource is smaller than the bandwidth of the PUSCH resource; or a sub-band specific precoder based on determining that the bandwidth of the SRS resource is greater than or equal to the bandwidth of the PUSCH resource.

In some aspects, a method of wireless communication, performed by a base station, may include receiving, using a first precoder, a first portion of a PUSCH communication transmitted in a portion of a PUSCH resource that overlaps with a bandwidth of an SRS resource, wherein the first portion of the PUSCH communication was precoded using the first precoder. The method may include receiving, using a second precoder, a second portion of the PUSCH communication transmitted in a portion of the PUSCH resource that does not overlap with the bandwidth of the SRS resource, wherein the second portion of the PUSCH communication was precoded using the second precoder.

In some aspects, a method of wireless communication, performed by a base station, may include transmitting a sub-band specific sounding reference signal (SRS) resource indicator identifying subsets of SRS resources, of a set of SRS resources, associated with precoding a PUSCH communication that is to be transmitted in a PUSCH resource. The method may include receiving the PUSCH communication after transmitting the sub-band specific SRS resource indicator, wherein the PUSCH communication was precoded based at least in part on the sub-band specific SRS resource indicator.

In some aspects, a base station for wireless communication may include memory and one or more processors operatively coupled to the memory. The memory and the one or more processors may be configured to determine whether a bandwidth of an SRS resource is smaller than a bandwidth of a PUSCH resource or is greater than or equal to the bandwidth of the PUSCH resource. The memory and the one or more processors may be configured to receive a PUSCH communication transmitted in the PUSCH resource using either: a wideband precoder based on determining that the bandwidth of the SRS resource is smaller than the bandwidth of the PUSCH resource; or a sub-band specific precoder based on determining that the bandwidth of the SRS resource is greater than or equal to the bandwidth of the PUSCH resource.

In some aspects, a base station for wireless communication may include memory and one or more processors operatively coupled to the memory. The memory and the one or more processors may be configured to receive, using a first precoder, a first portion of a PUSCH communication transmitted in a portion of a PUSCH resource that overlaps with a bandwidth of an SRS resource, wherein the first portion of the PUSCH communication was precoded using the first precoder. The memory and the one or more processors may be configured to receive, using a second precoder, a second portion of the PUSCH communication transmitted in a portion of the PUSCH resource that does not overlap with the bandwidth of the SRS resource, wherein the second portion of the PUSCH communication was precoded using the second precoder.

In some aspects, a base station for wireless communication may include memory and one or more processors operatively coupled to the memory. The memory and the one or more processors may be configured to transmit a sub-band specific sounding reference signal (SRS) resource indicator identifying subsets of SRS resources, of a set of SRS resources, associated with precoding a PUSCH communication that is to be transmitted in a PUSCH resource. The memory and the one or more processors may be configured to receive the PUSCH communication after transmitting the sub-band specific SRS resource indicator, wherein the PUSCH communication was precoded based at least in part on the sub-band specific SRS resource indicator.

In some aspects, a non-transitory computer-readable medium may store one or more instructions for wireless communication. The one or more instructions, when executed by one or more processors of a base station, may cause the one or more processors to: determine whether a bandwidth of an SRS resource is smaller than a bandwidth of a PUSCH resource or is greater than or equal to the bandwidth of the PUSCH resource. The one or more instructions, when executed by one or more processors of the base station, may cause the one or more processors to receive a PUSCH communication transmitted in the PUSCH resource using either: a wideband precoder based on determining that the bandwidth of the SRS resource is smaller than the bandwidth of the PUSCH resource; or a sub-band specific precoder based on determining that the bandwidth of the SRS resource is greater than or equal to the bandwidth of the PUSCH resource.

In some aspects, a non-transitory computer-readable medium may store one or more instructions for wireless communication. The one or more instructions, when executed by one or more processors of a base station, may cause the one or more processors to: receive, using a first precoder, a first portion of a PUSCH communication transmitted in a portion of a PUSCH resource that overlaps with a bandwidth of an SRS resource, wherein the first portion of the PUSCH communication was precoded using the first precoder. The one or more instructions, when executed by one or more processors of the base station, may cause the one or more processors to receive, using a second precoder, a second portion of the PUSCH communication transmitted in a portion of the PUSCH resource that does not overlap with the bandwidth of the SRS resource, wherein the second portion of the PUSCH communication was precoded using the second precoder.

In some aspects, a non-transitory computer-readable medium may store one or more instructions for wireless communication. The one or more instructions, when executed by one or more processors of a base station, may cause the one or more processors to: transmit a sub-band specific sounding reference signal (SRS) resource indicator identifying subsets of SRS resources, of a set of SRS resources, associated with precoding a PUSCH communication that is to be transmitted in a PUSCH resource. The one or more instructions, when executed by one or more processors of the base station, may cause the one or more processors to receive the PUSCH communication after transmitting the sub-band specific SRS resource indicator, wherein the PUSCH communication was precoded based at least in part on the sub-band specific SRS resource indicator.

In some aspects, an apparatus for wireless communication may include means for determining whether a bandwidth of an SRS resource is smaller than a bandwidth of a PUSCH resource or is greater than or equal to the bandwidth of the PUSCH resource. The apparatus may include means for receiving a PUSCH communication transmitted in the PUSCH resource using either: a wideband precoder based on determining that the bandwidth of the SRS resource is smaller than the bandwidth of the PUSCH resource; or a sub-band specific precoder based on determining that the bandwidth of the SRS resource is greater than or equal to the bandwidth of the PUSCH resource.

In some aspects, an apparatus for wireless communication may include means for receiving, using a first precoder, a first portion of a PUSCH communication transmitted in a portion of a PUSCH resource that overlaps with a bandwidth of an SRS resource, wherein the first portion of the PUSCH communication was precoded using the first precoder. The apparatus may include means for receiving, using a second precoder, a second portion of the PUSCH communication transmitted in a portion of the PUSCH resource that does not overlap with the bandwidth of the SRS resource, wherein the second portion of the PUSCH communication was precoded using the second precoder.

In some aspects, an apparatus for wireless communication may include means for transmitting a sub-band specific sounding reference signal (SRS) resource indicator identifying subsets of SRS resources, of a set of SRS resources, associated with precoding a PUSCH communication that is to be transmitted in a PUSCH resource. The apparatus may include means for receiving the PUSCH communication after transmitting the sub-band specific SRS resource indicator, wherein the PUSCH communication was precoded based at least in part on the sub-band specific SRS resource indicator.

Aspects generally include a method, apparatus, system, computer program product, non-transitory computer-readable medium, user equipment, base station, wireless communication device, or processing system as substantially described herein with reference to and as illustrated by the accompanying drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3, 4A-4C, 5, 6A-6G, 7A, and 7B are diagrams associated with sub-band specific SRS resource indicator indication for NCB-based frequency-selective uplink precoding, in accordance with various aspects of the present disclosure.

FIG. 8 is a diagram illustrating an example process performed, for example, by a user equipment, in accordance with various aspects of the present disclosure.

DETAILED DESCRIPTION

Figure 1:
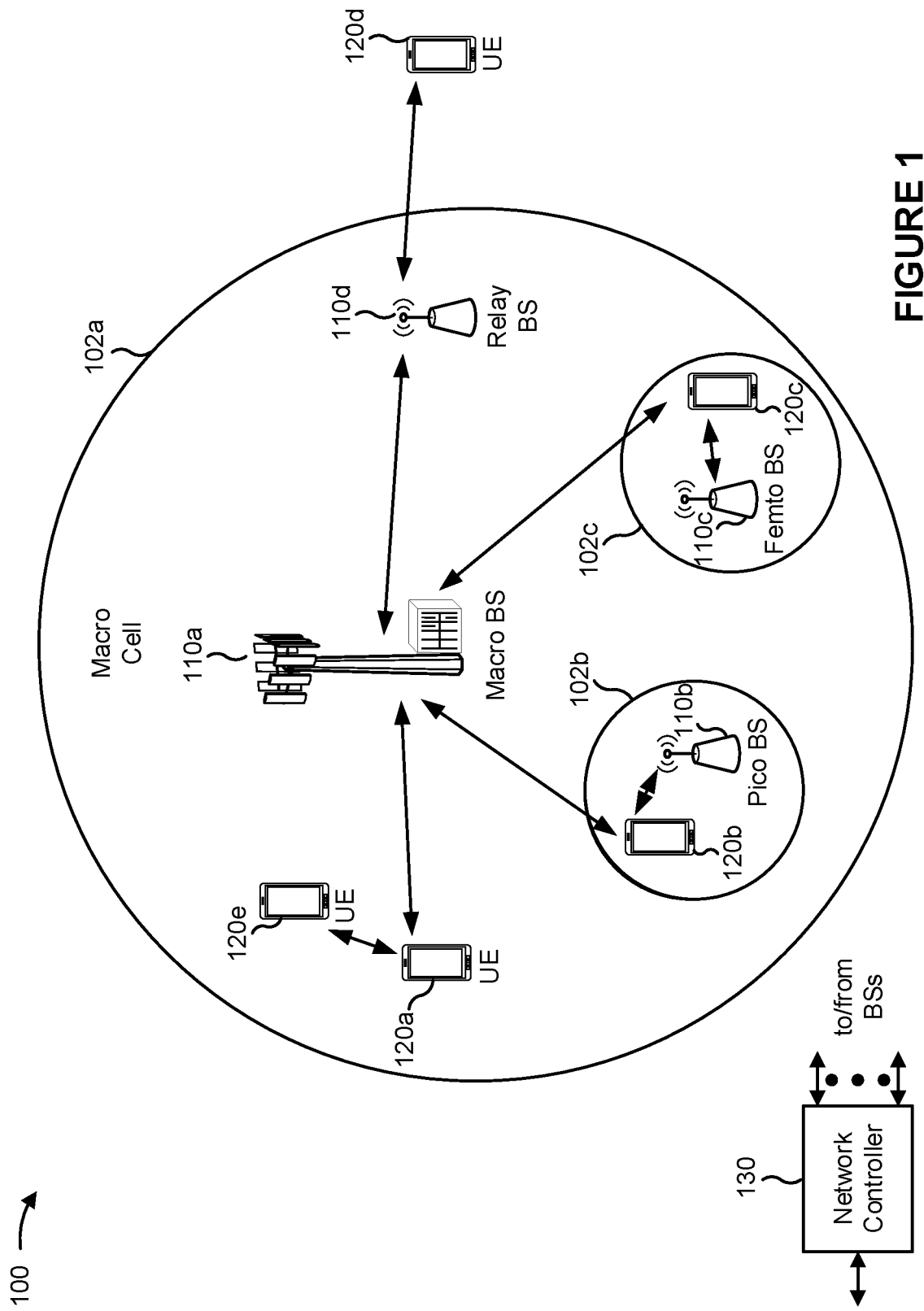
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, among other examples (collectively referred to as "elements"). These elements may be implemented using hardware, software, or combinations thereof. Whether such elements are implemented as hardware or software depends upon the particular application and design constraints imposed on the overall system.

Various aspects relate generally an SRS resource indicator (SRI) indication. Some aspects more specifically relate to sub-band specific SRI indication for NCB-based frequency-selective uplink precoding. In general, NCB-based precoding provides a UE with flexibility to select a precoder that is well suited to the transmission channel. The use of NCB-based uplink precoding reduces downlink signaling because a base station need not signal a precoding matrix indicator (PMI) or precoder to the UE. NCB-based frequency-selective uplink precoding allows the UE to use different NCB-based precoders in different allocated sub-bands of a given frequency band, meaning that the UE has the flexibility to select a precoder that is well suited for a transmission in a given sub-band. To support frequency-selective uplink precoding, the UE and the base station should agree on the method that the UE uses to select NCB-based precoders across the allocated frequency resources.

In one example aspect for implementing sub-band specific SRI indication for NCB-based frequency-selective precoding, a UE may precode a physical uplink shared channel (PUSCH) communication that is to be transmitted in a PUSCH resource using either a wideband precoder (for example, based on determining that a bandwidth of an SRS resource is smaller than a bandwidth of the PUSCH resource) or a sub-band specific precoder (for example, based on determining that the bandwidth of the SRS resource is greater than or equal to the bandwidth of the PUSCH resource). In another example aspect for implementing sub-band specific SRI indication for NCB-based frequency-selective precoding, a UE may precode a first portion of a PUSCH communication, to be transmitted in a portion of a PUSCH resource that overlaps with a bandwidth of an SRS resource, using a first precoder, and may precode a second portion of the PUSCH communication, to be transmitted in a portion of the PUSCH resource that does not overlap with the bandwidth of the SRS resource, using a second precoder. In another example aspect for implementing sub-band specific SRI indication for NCB-based frequency-selective precoding, a UE may precode a PUSCH communication to be transmitted in a PUSCH resource based at least in part on a sub-band specific SRS resource indicator identifying subsets of SRS resources associated with precoding the PUSCH communication.

Particular aspects of the subject matter described in this disclosure can be implemented to realize one or more of the following potential advantages. In some examples, the described techniques can be used to improve control of frequency-selective precoders. In some aspects, the improved control of frequency-selective precoders enables reduced inter-UE interference when implementing NCB-based frequency-selective precoding.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another or to one or more other BSs or network nodes (not shown) in the wireless network 100 through various types of backhaul interfaces such as a direct physical connection, a virtual network, among other examples using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, among other examples.

Wireless network 100 may be a heterogeneous network that includes BSs of different types, for example, macro BSs, pico BSs, femto BSs, relay BSs, among other examples. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs may also communicate with one another, for example, directly or indirectly via a wireless or wireline backhaul.

UEs 120 (for example, 120*a*, 120*b*, 120*c*, 120*d*, 120*e*) may be dispersed throughout wireless network 100, and each UE may be stationary or mobile. A UE may also be referred to as an access terminal, a terminal, a mobile station, a subscriber unit, a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, among other examples.

In general, any number of wireless networks may be deployed in a given geographic area. Each wireless network may support a particular RAT and may operate on one or more frequencies. A RAT may also be referred to as a radio technology, an air interface, among other examples. A frequency may also be referred to as a carrier, a frequency channel, among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, among other examples), a mesh network, among other examples. In such examples, the UE 120 may perform scheduling operations, resource selection operations, or other operations described elsewhere herein as being performed by the base station 110.

Figure 2:
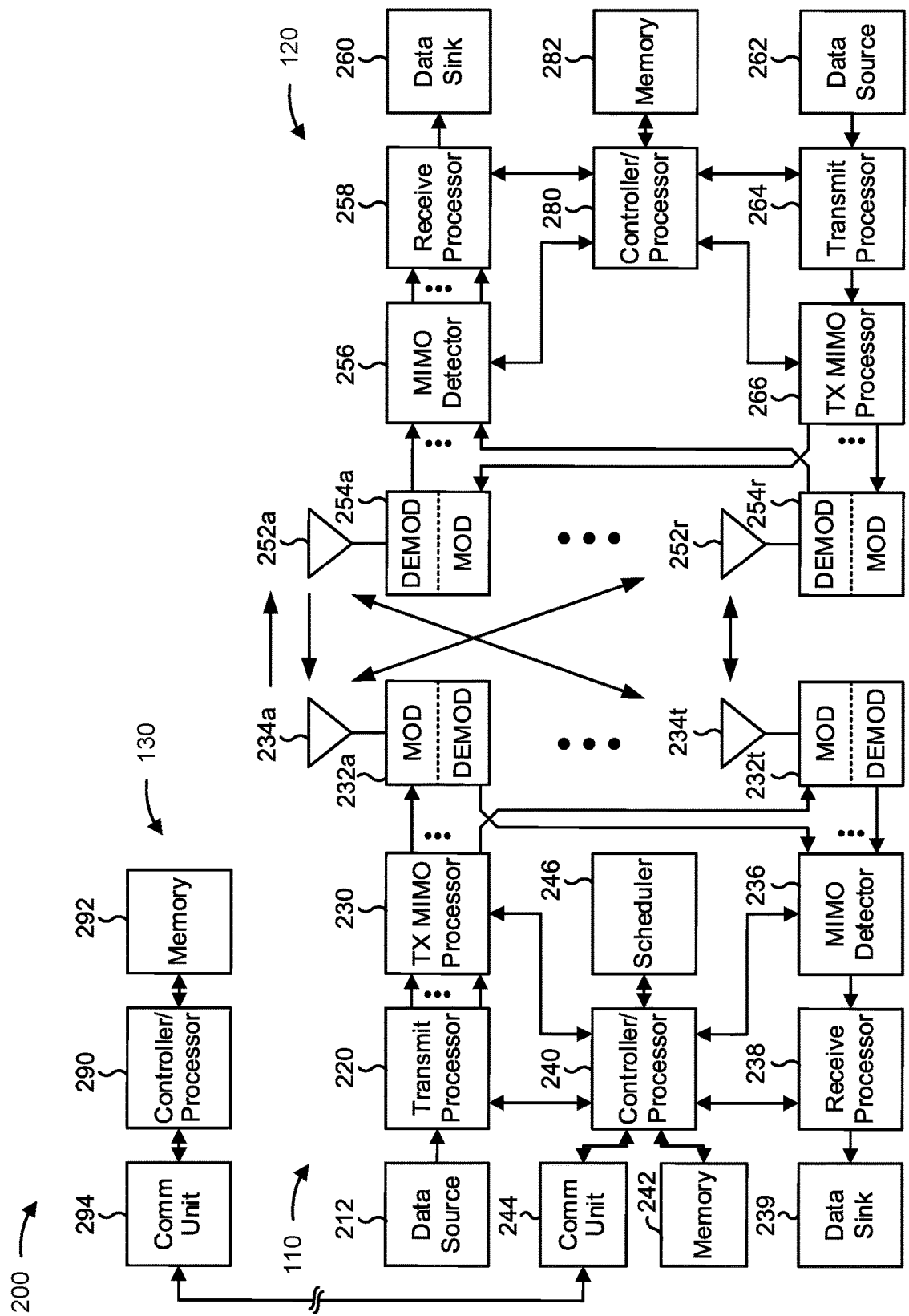
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, upper layer signaling, among other examples) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each modulator 232 may process a respective output symbol stream (for example, for OFDM among other examples) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM among other examples) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), among other examples. In some aspects, one or more components of UE 120 may be included in a housing.

On the uplink, at UE 120, a transmit processor 264 may receive and process data from a data source 262 and control information (for example, for reports comprising RSRP, RSSI, RSRQ, CQI, among other examples) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (for example, for DFT-s-OFDM, CP-OFDM, among other examples), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with sub-band specific sounding reference signal (SRS) resource indicator indication for non-codebook (NCB) based frequency-selective uplink precoding, as described in more detail elsewhere herein. For example, controller/processor 240 of base station 110, controller/processor 280 of UE 120, or any other component(s) of FIG. 2 may perform or direct operations of, for example, process 800 of FIG. 8, process 900 of FIG. 9, process 1000 of FIG. 10, process 1100 of FIG. 11, process 1200 of FIG. 12, process 1300 of FIG. 13, or other processes as described herein. Memories 242 and 282 may store data and program codes for base station 110 and UE 120, respectively. In some aspects, memory 242 or memory 282 may comprise a non-transitory computer-readable medium storing one or more instructions for wireless communication. For example, the one or more instructions, when executed by one or more processors of the base station 110 or the UE 120, may perform or direct operations of, for example, process 800 of FIG. 8, process 900 of FIG. 9, process 1000 of FIG. 10, process 1100 of FIG. 11, process 1200 of FIG. 12, process 1300 of FIG. 13, or other processes as described herein. A scheduler 246 may schedule UEs for data transmission on the downlink or uplink.

In some aspects, UE 120 may include means for determining whether a bandwidth of an SRS resource is smaller than a bandwidth of a PUSCH resource or is greater than or equal to the bandwidth of the PUSCH resource; means for precoding a PUSCH communication that is to be transmitted in the PUSCH resource using either: a wideband precoder based on determining that the bandwidth of the SRS resource is smaller than the bandwidth of the PUSCH resource, or a sub-band specific precoder based on determining that the bandwidth of the SRS resource is greater than or equal to the bandwidth of the PUSCH resource; means for transmitting the precoded PUSCH communication; among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, among other examples.

In some aspects, UE 120 may include means for precoding, using a first precoder, a first portion of a PUSCH communication that is to be transmitted in a portion of a PUSCH resource that overlaps with a bandwidth of an SRS resource; means for precoding, using a second precoder, a second portion of the PUSCH communication that is to be transmitted in a portion of the PUSCH resource that does not overlap with the bandwidth of the SRS resource; means for transmitting the precoded PUSCH communication; among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, among other examples.

In some aspects, UE 120 may include means for receiving an SRS resource indicator identifying subsets of SRS resources, of a set of SRS resources, associated with precoding a PUSCH communication that is to be transmitted in a PUSCH resource; means for precoding the PUSCH communication based at least in part on the sub-band specific SRS resource indicator; means for transmitting the precoded PUSCH communication; among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, among other examples.

In some aspects, base station 110 may include means for determining whether a bandwidth of an SRS resource is smaller than a bandwidth of a PUSCH resource or is greater than or equal to the bandwidth of the PUSCH resource; means for receiving a PUSCH communication transmitted in the PUSCH resource using either: a wideband precoder based on determining that the bandwidth of the SRS resource is smaller than the bandwidth of the PUSCH resource; or a sub-band specific precoder based on determining that the bandwidth of the SRS resource is greater than or equal to the bandwidth of the PUSCH resource; among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, among other examples.

In some aspects, base station 110 may include means for receiving, using a first precoder, a first portion of a PUSCH communication transmitted in a portion of a PUSCH resource that overlaps with a bandwidth of an SRS resource, wherein the first portion of the PUSCH communication was precoded using the first precoder; and receiving, using a second precoder, a second portion of the PUSCH communication transmitted in a portion of the PUSCH resource that does not overlap with the bandwidth of the SRS resource, wherein the second portion of the PUSCH communication was precoded using the second precoder; among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, among other examples.

In some aspects, base station 110 may include means for transmitting a sub-SRS resource indicator identifying subsets of SRS resources, of a set of SRS resources, associated with precoding a PUSCH communication that is to be transmitted in a PUSCH resource; means for receiving the PUSCH communication after transmitting the sub-band specific SRS resource indicator, wherein the PUSCH communication was precoded based at least in part on the sub-band specific SRS resource indicator; among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, among other examples.

In some wireless communication systems, a wireless communication device (for example, a UE 120, a base station 110) is capable of transmitting one or more data streams from multiple different antennas at the same time. Typically, precoding is applied to the data streams to distribute the data streams among the antennas. That is, data streams are multiplied with different weighting and phase shifting before being transmitted from respective antennas. Precoding is a process that distributes incoming data (for example, layered data) to different antenna ports. This can provide single-stream beamforming, where the same data stream is transmitted over each of the antennas. Here, the linear combined signal transmitted from the multiple antennas results in a directional radiation beam. This is typically referred to as beamforming. In another example, known as multiple-input multiple-output (MIMO), a plurality of data streams may be precoded and transmitted from different antennas. By virtue of the spatial diversity provided by the separately located antennas, the total capacity of the channel may be multiplied by the number of layers or streams.

In some cases, in association with performing uplink precoding, a base station may provide a UE with a precoding matrix indicator (PMI) from a predefined codebook. The UE may then select the precoder from the codebook based on the PMI for an uplink transmission (for example, an uplink MIMO transmission). Alternatively, the UE may select a precoder that is not necessarily restricted to a codebook, in some cases. Such non-codebook (NCB) based precoding provides the UE with flexibility to select a precoder that is well suited to the transmission channel. In the case of NCB-based uplink precoding, downlink signaling is reduced, since the base station need not signal the PMI or precoder to the UE.

In some cases, for realization of NCB-based uplink precoding, use of only a wideband sounding reference signal (SRS) resource indicator field is supported. The wideband SRS resource indicator (SRI) field corresponds to a predetermined combination of SRS resources in a configured set of SRS resources. Here, the UE may be configured to determine a precoder and transmission rank based on the wideband SRI field. The UE may receive the wideband SRI in downlink control information (DCI). For determination of a PUSCH precoder in NCB-based uplink MIMO, signaling of only SRI(s) may be supported (without a transmitted PMI (TPMI) indication). Here, only one SRS port for each SRS resource can be configured, and a maximum number of SRS resources that can be configured for NCB-based uplink transmission is 4. Thus, a total of up to 4 SRS ports can be indicated by SRIs using one DCI field. Notably, to support higher rank transmission, multiple SRS resources should be indicated, and the UE may use a particular SRS resource to associate with the precoding of a particular PUSCH layer. Generally, the UE can be configured with only one SRS resource set with the following details: the UE can be configured to simultaneously transmit up to n SRS resources, where n is part of UE capability signalling; and the SRS resources transmitted simultaneously occupy the same resource blocks (RBs). The rank of the uplink transmission can be derived from the SRI field, and encoding of a demodulation reference signal (DMRS) indicator is determined from the derived rank. The base station may be configured to determine the precoder used by the UE based on this DMRS indicator.

In some wireless communication systems, NCB-based frequency-selective uplink precoding may be supported. NCB-based frequency-selective uplink precoding allows a UE to use different NCB-based precoders in different allocated sub-bands of a given frequency band. Here, the UE and the base station should agree on the method that the UE uses to select NCB-based precoders across the allocated frequency resources. In some cases, NCB-based frequency-selective uplink precoding can be carried out as follows: one SRS resource may be made up of multiple SRS frequency hoppings, where different hoppings may be based on different precoders, and the base station indicates a wideband SRI. Here, the UE may implement frequency-selective precoding based on the indicated wideband SRI. However, one drawback of this technique is that each frequency sub-band uses identical SRS resources. Thus, the base station may not be able to optimize sub-band specific precoders, since the sub-band specific precoders are decided by the UE when transmitting the SRS hoppings. In other words, current implementation of NCB-based frequency-selective uplink precoding does not provide control of the frequency-selective precoder, which may result in significant inter-UE-interference.

Some aspects described herein provide techniques and apparatuses for sub-band specific SRI indication for NCB-based frequency-selective uplink precoding. In some aspects, the sub-band specific SRI indication for NCB-based frequency-selective precoding provides improved control of frequency-selective precoders, thereby enabling reduced inter-UE interference. Example aspects for implementing sub-band specific SRI indication for NCB-based frequency-selective precoding in various scenarios are described below.

FIGS. 3, 4A-4C, 5A-5D, 6A-6D, 7A, and 7B are diagrams associated with sub-band specific SRI indication for NCB-based frequency-selective uplink precoding, in accordance with various aspects of the present disclosure.

In some aspects a UE (for example, UE 120) may be configured to precode a PUSCH communication using a wideband precoder or one or more sub-band specific precoders based at least in part on a bandwidth of an SRS resource and a bandwidth of a PUSCH resource associated with transmitting the PUSCH communication.

Figure 3:
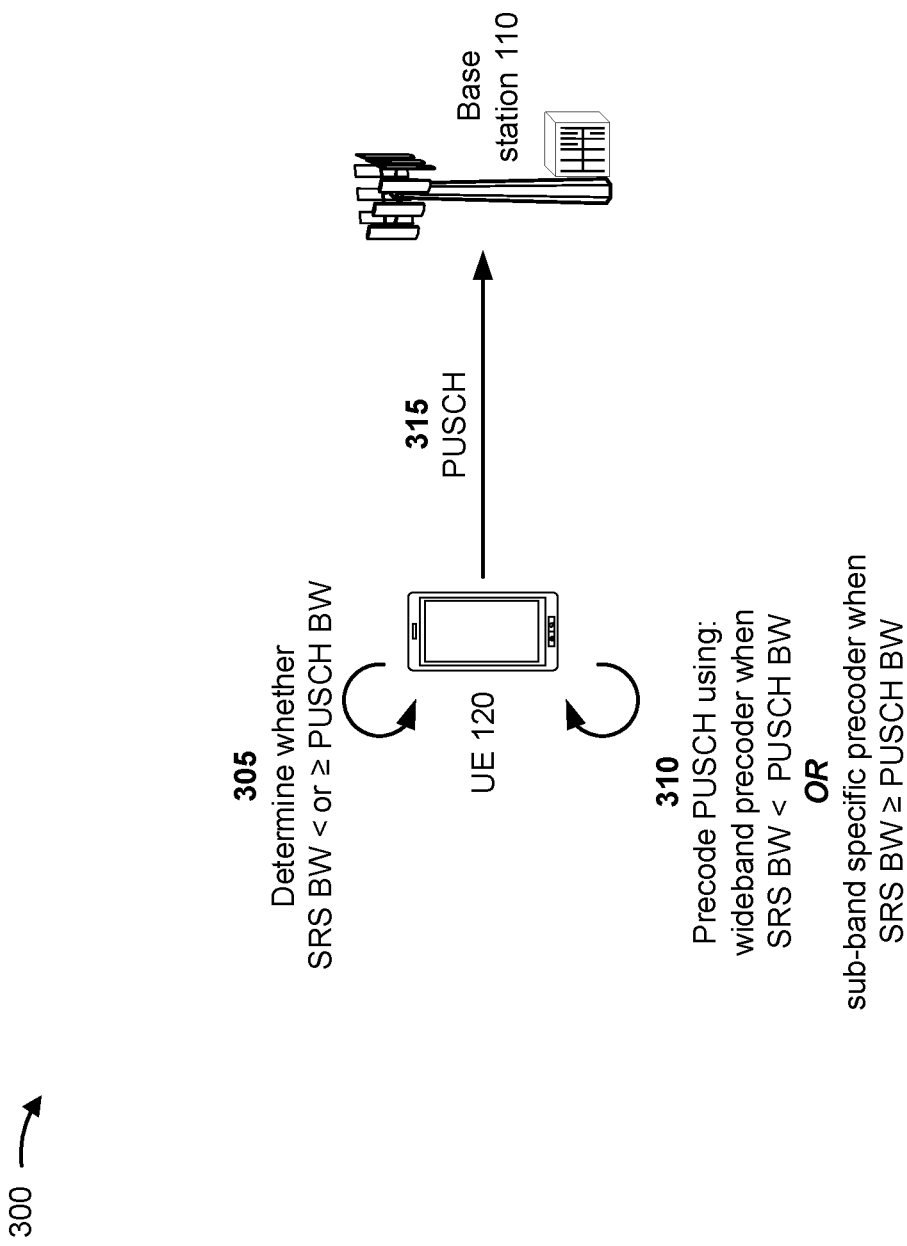

FIG. 3 is a diagram of a first example illustrating precoding of a PUSCH communication based at least in part on a bandwidth of an SRS resource and a bandwidth of a PUSCH resource associated with transmitting the PUSCH communication. In FIG. 3, a UE (for example, UE 120) is configured by a base station (for example, base station 110) with an SRS resource, and is scheduled by the base station to transmit a PUSCH communication in a PUSCH resource.

As shown in FIG. 3, in a first operation 305, the UE may determine whether a bandwidth of the SRS resource configured for the UE is smaller than a bandwidth of the PUSCH resource or is greater than or equal to the bandwidth of the PUSCH resource. For example, the UE may compare a bandwidth of the configured SRS resource and a bandwidth of the PUSCH resource in order to determine whether the bandwidth of the SRS resource is smaller than or greater than or equal to the bandwidth of the PUSCH resource.

In a second operation 310, in some aspects, when the UE determines that the bandwidth of the SRS resource is smaller than the bandwidth of the PUSCH resource, the UE may precode the PUSCH communication using a wideband precoder (for example, based at least in part on a wideband SRI indication signaled by the base station 110). Alternatively, as further indicated by operation 310, when the UE determines that the bandwidth of the SRS resource is greater than or equal to the bandwidth of the PUSCH resource, the UE may precode the PUSCH communication using a sub-band specific precoder. In some aspects, the sub-band specific precoder may be signaled to the UE in a sub-band specific SRI using a technique described below.

In a third operation 315, in some aspects, the UE may transmit the PUSCH communication in the PUSCH resource after precoding the PUSCH communication (for example, using either the wideband precoder or the sub-band specific precoder).

In some aspects, a base station (for example, base station 110) may receive the PUSCH communication after transmission of the PUSCH communication by the UE. For example, the base station may determine whether the bandwidth of the SRS resource is smaller than the bandwidth of the PUSCH resource or is greater than or equal to the bandwidth of the PUSCH resource (for example, in a similar manner as that of the UE). The base station may then receive the PUSCH communication in the PUSCH resource using the wideband precoder (when the bandwidth of the SRS resource is determined to be smaller than the bandwidth of the PUSCH resource) or using the sub-band specific precoder (when the bandwidth of the SRS resource is determined to be greater than or equal to the bandwidth of the PUSCH resource).

Figure 4A:
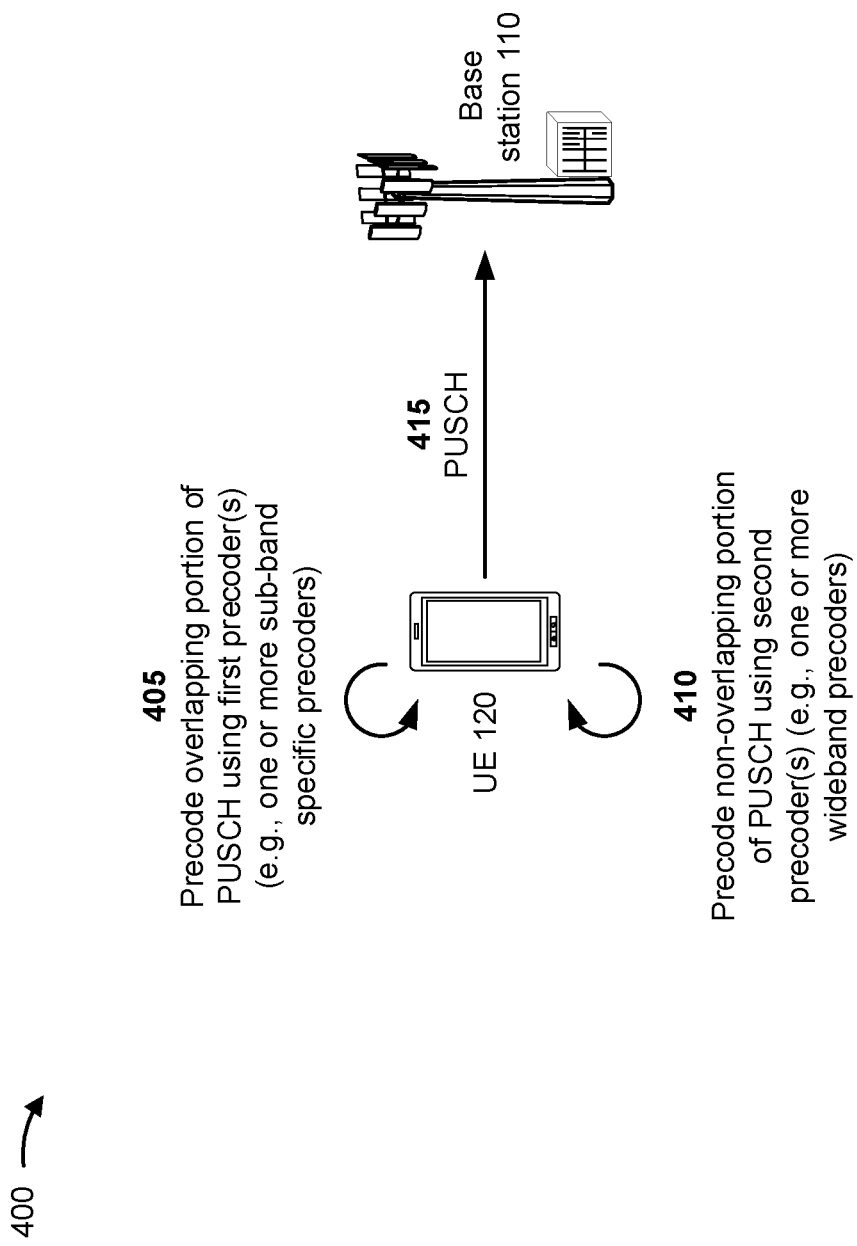

FIGS. 4A-4C are diagrams associated with a second example illustrating precoding of a PUSCH communication based at least in part on a bandwidth of an SRS resource and a bandwidth of a PUSCH resource associated with transmitting the PUSCH communication. In FIGS. 4A-4C, the UE is configured with an SRS resource, and is scheduled to transmit a PUSCH communication in a PUSCH resource.

As shown in FIG. 4A, in a first operation 405, the UE may precode a first portion of the PUSCH communication using a first precoder. Here, the first portion of the PUSCH communication is to be transmitted in a portion of the PUSCH resource that overlaps with a bandwidth of the SRS resource. In some aspects, the first precoder may include one or more sub-band specific precoders. Thus, in some aspects, the UE may perform sub-band specific precoding for a portion of the PUSCH communication that overlaps with the SRS resource. In some aspects, the first precoder may be associated with an SRI provided by the base station, such as an SRI indicated by signaling that scheduled the PUSCH resource. In some aspects, the sub-band specific precoder may be signaled to the UE in a sub-band specific SRI using a technique described below.

In a second operation 410, the UE may precode a second portion of the PUSCH communication using a second precoder. Here, the second portion of the PUSCH communication is to be transmitted in a portion of the PUSCH resource that does not overlap with the bandwidth of the SRS resource. In some aspects, the second precoder may be a wideband precoder. Thus, in some aspects, the UE may perform wideband precoding for a portion of the PUSCH communication that does not overlap with the SRS resource.

In a third operation 415, the UE may transmit the PUSCH communication in the PUSCH resource after precoding the first and second portions of the PUSCH communication.

In some aspects, the UE may precode the first and second portions of the PUSCH communication in the above-described manner when the bandwidth of the SRS resource overlaps with the bandwidth of the PUSCH resource and when the bandwidth of the SRS resource is smaller than the bandwidth of the PUSCH resource. For example, the UE may compare a bandwidth of the configured SRS resource and a bandwidth of the PUSCH resource, and determine that the bandwidth of the SRS resource overlaps with the bandwidth of the PUSCH resource and is smaller than the bandwidth of the PUSCH resource, and may proceed accordingly.

FIGS. 4B and 4C illustrate the manner in which the UE may precode the first and second portions of the PUSCH communication as described in association with FIG. 4A. FIG. 4B illustrates an SRS resource having a smaller bandwidth than that of a PUSCH resource. FIG. 4C illustrates a manner in which the UE may precode the PUSCH communication. As shown in FIG. 4C, the UE may precode a portion of the PUSCH communication that overlaps with the bandwidth of the SRS resource (identified as SB precoding 1A through 1C) using one or more sub-band specific precoders, and may precode a portion of the PUSCH communication that does not overlap with the SRS resource (identified as WB precoding 0 and 1) using one or more wideband precoders.

In some aspects, a base station (for example, base station 110) may receive the first and second portions of the PUSCH communication after transmission by the UE. For example, the base station may receive, using the first precoder, the first portion of the PUSCH communication transmitted in the portion of the PUSCH resource that overlaps with the bandwidth of the SRS resource (for example, since the first portion of the PUSCH communication was precoded using the first precoder). Similarly, the base station may receive, using the second precoder, the second portion of the PUSCH communication transmitted in the portion of the PUSCH resource that does not overlap with the bandwidth of the SRS resource (for example, since the second portion of the PUSCH communication was precoded using the second precoder).

In some aspects a UE (for example, UE 120) may precode (at least a portion of) a PUSCH communication based at least in part on a sub-band specific SRI. In some aspects, a sub-band specific SRI may identify subsets of SRS resources, of a set of SRS resources, associated with precoding the PUSCH communication (to be transmitted in a PUSCH resource).

FIG. 5 is a diagram of an example illustrating precoding (at least a portion of) a PUSCH communication based at least in part on a sub-band specific SRI.

As shown in FIG. 5, in a first operation 505, the UE may receive a sub-band specific SRI. In some aspects, the sub-band specific SRI may identify one or more subsets of SRS resources, of a set of SRS resources configured on the UE, associated with precoding the PUSCH communication. In other words, in some aspects the sub-band specific SRI may identify a subset of SRS resources associated with precoding data to be transmitted in a given sub-band. Additional details regarding the sub-band specific SRI are provided below with respect to FIGS. 6A-6G, 7A, and 7B.

In a second operation 510, the UE may precode the PUSCH communication based at least in part on the sub-band specific SRS resource indicator. For example, the UE may precode one or more portions of the PUSCH communication using one or more sub-band specific precoders, as indicated by the sub-band specific SRI. In a third operation 515, the UE may transmit the PUSCH communication after precoding the PUSCH communication based at least in part on the sub-band specific SRS resource indicator.

In some aspects, a base station (for example, base station 110) may receive a portion of the PUSCH communication after transmission by the UE. For example, the base station may transmit the sub-band specific SRS resource indicator identifying the subsets of SRS resources associated with precoding the PUSCH communication to be transmitted in the PUSCH resource. The base station may then receive the portion of the PUSCH communication after transmitting the sub-band specific SRS resource indicator (for example, after the PUSCH communication is precoded by the by the UE based at least in part on the identified SRS resource).

In some aspects, the sub-band specific SRI may be used when a bandwidth of the set of SRS resources is greater than or equal to a bandwidth of the PUSCH resource. Such a case is illustrated in FIG. 6A, where a bandwidth of a set of SRS resources (SRS0 through SRS3) is equal to a bandwidth of a PUSCH resource (a bandwidth comprising sub-bands SB0 through SB3).

In such an aspect, the sub-band specific SRI may include information that identifies a joint rank associated with all sub-bands of the PUSCH resource, and information that identifies a subset of the set of SRS resources for each sub-band of the PUSCH resource. FIG. 6B is a diagram illustrating an example associated with a sub-band specific SRI that includes information that identifies a joint rank associated with all sub-bands of the PUSCH resource, and information that identifies a subset of the set of SRS resources for each sub-band of the PUSCH resource.

Similarly, in some aspects, the sub-band specific SRI may include information that identifies a joint rank and a subset of the set of SRS resources for each sub-band of the PUSCH resource.

In some aspects, the sub-band specific SRI may include information that identifies a joint rank associated with all sub-bands of the PUSCH resource, and information that identifies a differential sub-band specific SRI for each sub-band of the PUSCH resource. Here, the differential sub-band specific SRS resource indication may comprise at least one wideband SRS resource indication (identifying SRS resources common for all sub-bands) and a sub-band specific subset of the set of SRS resources for each sub-band. FIG. 6C is a diagram illustrating an example associated with a sub-band specific SRI that includes information that identifies a joint rank associated with all sub-bands of the PUSCH resource, and information that identifies a differential sub-band specific SRI for each sub-band of the PUSCH resource.

Similarly, in some aspects, the sub-band specific SRI may include information that identifies a joint rank and a differential sub-band specific SRS resource indication for each sub-band of the PUSCH resource. Here, the differential sub-band specific SRS resource indication may comprise at least one wideband SRS resource indication identifying SRS resources common for all sub-bands and a sub-band specific subset of the set of SRS resources for each sub-band.

FIGS. 6D-6G provide example details for generating an SRI including information that identifies a differential sub-band specific SRI for each sub-band of the PUSCH resource for various maximum PUSCH ranks (L_max) and various numbers of SRS resources for NCB-based sounding (N_srs).

In the example shown in FIG. 6D, the maximum rank is 1 (L_max=1), the number of NCB-based SRS resources is 3 (N_srs=3), 2 bits are used to indicate an SRS resource indicator common for all sub-bands (WB-SRI=2 bit), and 1 bit is used to indicate a sub-band specific SRS resource indicator (SB_SRI=1 bit). Here, the WB_SRI being set to 0, 1, or 2 corresponds to cases where the sub-band specific SRS resource can only be chosen from SRS resource pairs of (1, 2), (0, 2), or (0, 1) respectively, and the 1 bit SB_SRI further identifies a sub-band specific SRS resource from the corresponding SRS resource pairs.

In the examples shown in FIG. 6E, the maximum rank is 2 (L_max=2). In the example shown at the top left of FIG. 6E, the number of NCB-based SRS resources is 2 (N_srs=2), 1 bit is used to indicate an SRS resource indicator common for all sub-bands (WB-SRI=1 bit), and 1 bit is used to indicate a sub-band specific SRS resource indicator (SB_SRI=1 bit). When the rank is 1 (Rank=1), the WB-SRI is set to 0 (WB_SRI=0), and the 1 bit SB_SRI identifies an sub-band specific SRS resource from the two possible SRS resources. When the rank is 2 (Rank=2) the WB-SRI is set to 1 (WB_SRI=1) and, since there are only two SRS resources, the 1 bit SB_SRI is not used (for example, since both SRS resources should be used to transmit a rank 2 PUSCH communication).

In the example shown at the top right of FIG. 6E, the number of NCB-based SRS resources is 3 (N_srs=3), 3 bits are used to indicate the SRS resource indicator common for all sub-bands (WB-SRI=3 bit), and 1 bit is used to indicate a sub-band specific SRS resource indicator (SB_SRI=1 bit). When the rank is 2 (Rank=2), the WB-SRI being set to 0, 1, or 2 corresponds to cases where a single common SRS resource from resources (0, 1, 2) for all sub-bands is chosen from the three respective SRS resources. The 1 bit SB_SRI further identifies another sub-band specific SRS resource from the remaining two SRS resources. When the rank is 1 (Rank=1), the WB_SRI being set to 3, 4, or 5 corresponds to cases where the sub-band specific SRS resource can only be chosen from SRS resource pairs of (0, 1), (0, 2), or (1, 2) respectively, and the 1 bit SB_SRI further identifies a sub-band specific SRS resource from the corresponding SRS resource pairs.

In the example shown at the bottom of FIG. 6E, the number of NCB-based SRS resources is 4 (N_srs=4), 3 bits are used to indicate the SRS resource indicator common for all sub-bands (WB-SRI=3 bit), and 2 bits are used to indicate a sub-band specific SRS resource indicator (SB_SRI=2 bit). When the rank is 2 (Rank=2), the WB_SRI being set to 0, 1, 2, or 3 corresponds to cases where a single common SRS resource from resources (0, 1, 2, 3) for all sub-bands is chosen from the four respective SRS resources. The 2 bit SB_SRI further identifies a sub-band specific SRS resource from the remaining three SRS resources. When the rank is 1 (Rank=1), the WB_SRI is set to 4 and the 2 bit SB_SRI identifies one SRS resource from the four SRS resources.

In the examples shown in FIG. 6F, the maximum rank is 3 (L_max=3). In the example shown at the top of FIG. 6F, the number of NCB-based SRS resources is 3 (N_srs=3), 3 bits are used to indicate an SRS resource indicator common for all sub-bands (WB-SRI=3 bit), and 1 bit is used to indicate a sub-band specific SRS resource indicator (SB_SRI=1 bit). When the rank is 1 (Rank=1), the WB_SRI being set to 0, 1, or 2 corresponds to cases where the sub-band specific SRS resource can only be chosen from SRS resource pairs of (1, 2), (0, 2), or (0, 1) respectively, and the 1 bit SB_SRI further identifies a sub-band specific SRS resource from the corresponding SRS resource pairs. When the rank is 2 (Rank=2), the WB_SRI being set to 3, 4, or 5 corresponds to cases where a single common SRS resource from resources (0, 1, 2) for all sub-bands is chosen from the three respective SRS resources. The 1 bit SB_SRI further identifies another sub-band specific SRS resource from the remaining two SRS resources. When the rank is 3 (Rank=3), the WB_SRI is set to 6 (WB_SRI=6) and, since there are only three SRS resources, the 1 bit SB_SRI is not used (for example, since all three SRS resources should be used to transmit a rank 3 PUSCH communication).

In the example shown at the bottom of FIG. 6F, the number of NCB-based SRS resources is 4 (N_srs=4), 4 bits are used to indicate an SRS resource indicator common for all sub-bands (WB-SRI=4 bit), and 2 bits are used to indicate a sub-band specific SRS resource indicator (SB_SRI=2 bit). When the rank is 1 (Rank=1) the WB_SRI is set to 0 (WB_SRI=0), and the 2 bit SB_SRI identifies an sub-band specific SRS resource from the four possible SRS resources. When the rank is 2 (Rank=2), the WB_SRI being set to 1, 2, 3, or 4 corresponds to cases where a single common SRS resource from resources (0, 1, 2, 3) for all sub-bands is chosen from the four respective SRS resources. The 2 bit SB_SRI further identifies a sub-band specific SRS resource from the remaining three SRS resources. When the rank is 3 (Rank=3), the WB_SRI being set to 5, 6, 7, or 8 corresponds to cases where a single common SRS resource from resources (0, 1, 2, 3) for all sub-bands is chosen from the four respective SRS resources. The 2 bit SB_SRI further identifies a pair of sub-band specific SRS resource from the remaining three SRS resources.

In the example shown in FIG. 6G, the maximum rank is 4 (L_max=4), the number of NCB-based SRS resources is 4 (N_srs=4), 4 bits are used to indicate an SRS resource indicator common for all sub-bands (WB-SRI=4 bit), and 2 bits are used to indicate a sub-band specific SRS resource indicator (SB_SRI=2 bit). When the rank is 1 (Rank=1) the WB_SRI is set to 0 (WB_SRI=0), and the 2 bit SB_SRI identifies an sub-band specific SRS resource from the four possible SRS resources. When the rank is 2 (Rank=2), the WB_SRI being set to 1, 2, 3, or 4 corresponds to cases where a single common SRS resource from resources (0, 1, 2, 3) for all sub-bands is chosen from the four respective SRS resources. The 2 bit SB_SRI further identifies a sub-band specific SRS resource from the remaining three SRS resources. When the rank is 3 (Rank=3), the WB_SRI being set to 5, 6, 7, or 8 corresponds to cases where a single common SRS resource from resources (0, 1, 2, 3) for all sub-bands is chosen from the four respective SRS resources. The 2 bit SB_SRI further identifies a pair of sub-band specific SRS resource from the remaining three SRS resources. When the rank is 4 (Rank=4), the WB-SRI is set to 9 (WB_SRI=9) and, since there are only four SRS resources, the 2 bit SB_SRI is not used (for example, since all four SRS resources should be used to transmit a rank 4 PUSCH communication).

In some aspects, the sub-band specific SRI may be used when multiple SRS resources, of the set of SRS resources, occupy different frequency resources and comprise a bandwidth that is greater than or equal to a bandwidth of the PUSCH resource. Such a case is illustrated in FIG. 7A, where a bandwidth of a set of SRS resources (SRS0 through SRS15) is equal to a bandwidth of a PUSCH resource (a bandwidth comprising sub-bands SB0 through SB3).

In such an aspect, the sub-band specific SRI may include information associating a layer of the PUSCH communication with a subset of the set of SRS resources that comprise a bandwidth that is greater than or equal to a bandwidth of the PUSCH resource. FIG. 7B is a diagram illustrating an example associated with a sub-band specific SRI that includes information associating a layer of the PUSCH communication with a subset of the set of SRS resources that comprise a bandwidth that is greater than or equal to a bandwidth of the PUSCH resource.

FIG. 8 is a diagram illustrating an example process 800 performed, for example, by a user equipment, in accordance with various aspects of the present disclosure. Example process 800 is an example where a user equipment (for example, user equipment 120 among other examples) performs operations associated with sub-band specific SRI indication for NCB-based frequency-selective uplink precoding.

As shown in FIG. 8, in some aspects, process 800 may include determining whether a bandwidth of an SRS resource is smaller than a bandwidth of a PUSCH resource or is greater than or equal to the bandwidth of the PUSCH resource (block 810). For example, the user equipment (for example, using receive processor 258, transmit processor 264, controller/processor 280, memory 282, among other examples) may determine whether a bandwidth of an SRS resource is smaller than a bandwidth of a PUSCH resource or is greater than or equal to the bandwidth of the PUSCH resource, as described above.

As further shown in FIG. 8, in some aspects, process 800 may include precoding a PUSCH communication that is to be transmitted in the PUSCH resource using either a wideband precoder based on determining that the bandwidth of the SRS resource is smaller than the bandwidth of the PUSCH resource; or a sub-band specific precoder based on determining that the bandwidth of the SRS resource is greater than or equal to the bandwidth of the PUSCH resource (block 820). For example, the user equipment (for example, using transmit processor 264, controller/processor 280, memory 282, among other examples) may precode a PUSCH communication that is to be transmitted in the PUSCH resource using either a wideband precoder based on determining that the bandwidth of the SRS resource is smaller than the bandwidth of the PUSCH resource; or a sub-band specific precoder based on determining that the bandwidth of the SRS resource is greater than or equal to the bandwidth of the PUSCH resource, as described above.

As further shown in FIG. 8, in some aspects, process 800 may include transmitting the precoded PUSCH communication (block 830). For example, the user equipment (for example, using transmit processor 264, controller/processor 280, memory 282, among other examples) may transmit the PUSCH communication after precoding the PUSCH communication, as described above.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
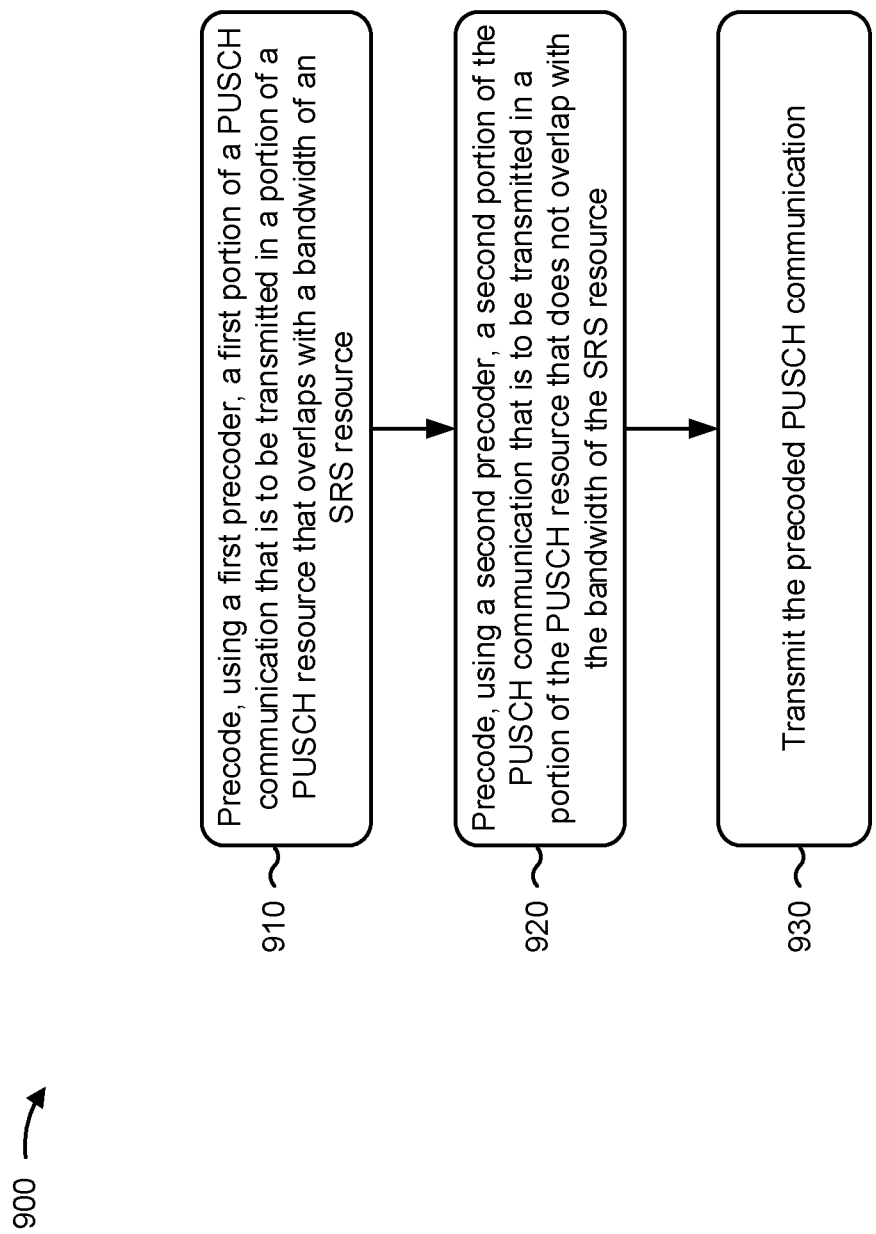
FIG. 9 is a diagram illustrating an example process performed, for example, by a user equipment, in accordance with various aspects of the present disclosure.

FIG. 9 is a diagram illustrating an example process 900 performed, for example, by a user equipment, in accordance with various aspects of the present disclosure. Example process 900 is an example where a user equipment (for example, user equipment 120 among other examples) performs operations associated with sub-band specific SRI indication for NCB-based frequency-selective uplink precoding.

As shown in FIG. 9, in some aspects, process 900 may include precoding, using a first precoder, a first portion of a PUSCH communication that is to be transmitted in a portion of a PUSCH resource that overlaps with a bandwidth of an SRS resource (block 910). For example, the user equipment (for example, using transmit processor 264, controller/processor 280, memory 282, among other examples) may precode, using a first precoder, a first portion of a PUSCH communication that is to be transmitted in a portion of a PUSCH resource that overlaps with a bandwidth of an SRS resource, as described above.

As further shown in FIG. 9, in some aspects, process 900 may include precoding, using a second precoder, a second portion of the PUSCH communication that is to be transmitted in a portion of the PUSCH resource that does not overlap with the bandwidth of the SRS resource (block 920). For example, the user equipment (for example, using transmit processor 264, controller/processor 280, memory 282, among other examples) may precode, using a second precoder, a second portion of the PUSCH communication that is to be transmitted in a portion of the PUSCH resource that does not overlap with the bandwidth of the SRS resource, as described above.

As further shown in FIG. 9, in some aspects, process 900 may include transmitting the precoded PUSCH communication (block 930). For example, the user equipment (for example, using transmit processor 264, controller/processor 280, memory 282, among other examples) may transmit the PUSCH communication after precoding the first portion of the PUSCH communication and the second portion of the PUSCH communication, as described above.

Process 900 may include additional aspects, such as any single aspect or any combination of aspects described below or in connection with one or more other processes described elsewhere herein.

In a first additional aspect, the bandwidth of the SRS resource is smaller than the bandwidth of the PUSCH resource.

In a second additional aspect, alone or in combination with the first aspect, the first precoder is associated with an SRS resource indicator indicated by signaling that scheduled the PUSCH resource.

In a third additional aspect, alone or in combination with one or more of the first and second aspects, the first precoder comprises a plurality of sub-band specific precoders.

In a fourth additional aspect, alone or in combination with one or more of the first through third aspects, the second precoder is a wideband precoder.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
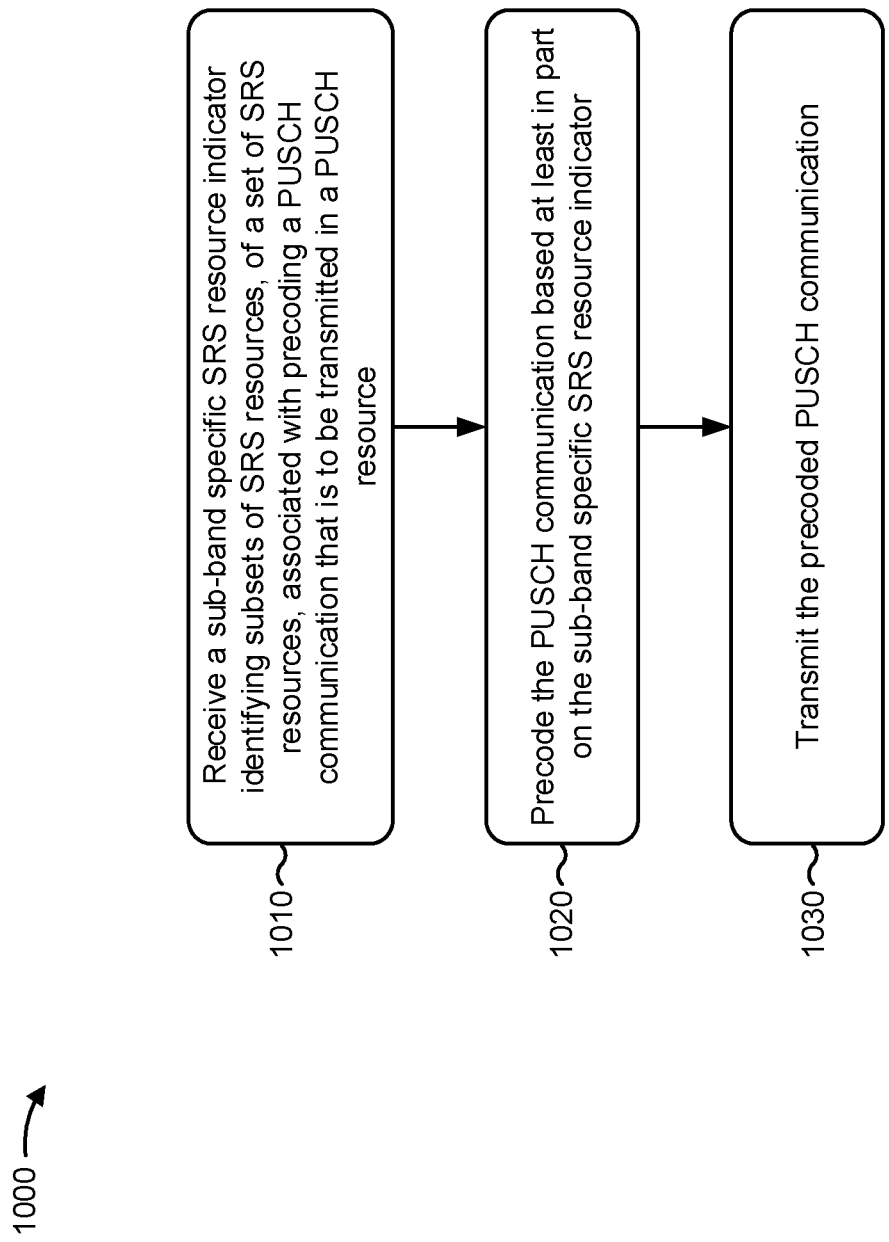
FIG. 10 is a diagram illustrating an example process performed, for example, by a user equipment, in accordance with various aspects of the present disclosure.

FIG. 10 is a diagram illustrating an example process 1000 performed, for example, by a user equipment, in accordance with various aspects of the present disclosure. Example process 1000 is an example where a user equipment (for example, user equipment 120 among other examples) performs operations associated with sub-band specific SRI indication for NCB-based frequency-selective uplink precoding.

As shown in FIG. 10, in some aspects, process 1000 may include receiving a sub-band SRS resource indicator identifying subsets of SRS resources, of a set of SRS resources, associated with precoding a PUSCH communication that is to be transmitted in a PUSCH resource (block 1010). For example, the user equipment (for example, using receive processor 258, controller/processor 280, memory 282, among other examples) may receive a sub-band SRS resource indicator identifying subsets of SRS resources, of a set of SRS resources, associated with precoding a PUSCH communication that is to be transmitted in a PUSCH resource, as described above.

As further shown in FIG. 10, in some aspects, process 1000 may include precoding the PUSCH communication based at least in part on the sub-band specific SRS resource indicator (block 1020). For example, the user equipment (for example, using transmit processor 264, controller/processor 280, memory 282, among other examples) may precode the PUSCH communication based at least in part on the sub-band specific SRS resource indicator, as described above.

As further shown in FIG. 10, in some aspects, process 1000 may include transmitting the precoded PUSCH communication (block 1030). For example, the user equipment (for example, using transmit processor 264, controller/processor 280, memory 282, among other examples) may transmit the PUSCH communication after precoding the PUSCH communication based at least in part on the sub-band specific SRS resource indicator, as described above.

Process 1000 may include additional aspects, such as any single aspect or any combination of aspects described below or in connection with one or more other processes described elsewhere herein.

In a first additional aspect, a bandwidth of the set of SRS resources is greater than or equal to a bandwidth of the PUSCH resource.

In a second additional aspect, alone or in combination with the first aspect, the sub-band specific SRS resource indicator includes information that identifies a joint rank associated with all sub-bands of the PUSCH resource, and information that identifies a subset of the set of SRS resources for each sub-band of the PUSCH resource.

In a third additional aspect, alone or in combination with one or more of the first and second aspects, the sub-band specific SRS resource indicator includes information that identifies a joint rank and a subset of the set of SRS resources for each sub-band of the PUSCH resource.

In a fourth additional aspect, alone or in combination with one or more of the first through third aspects, the sub-band specific SRS resource indicator includes information that identifies a joint rank associated with all sub-bands of the PUSCH resource, and information that identifies a differential sub-band specific SRS resource indication for each sub-band of the PUSCH resource. In some aspects, the differential sub-band specific SRS resource indication comprises at least one wideband SRS resource indication identifying SRS resources common for all sub-bands and a sub-band specific subset of the set of SRS resources for each sub-band.

In a fifth additional aspect, alone or in combination with one or more of the first through fourth aspects, the sub-band specific SRS resource indicator includes information that identifies a joint rank and a differential sub-band specific SRS resource indication for each sub-band of the PUSCH resource. In some aspects, the differential sub-band specific SRS resource indication comprises at least one wideband SRS resource indication identifying SRS resources common for all sub-bands and a sub-band specific subset of the set of SRS resources for each sub-band.

In a sixth additional aspect, alone or in combination with one or more of the first through fifth aspects, multiple SRS resources, of the set of SRS resources, occupy different frequency resources and comprise a bandwidth that is greater than or equal to a bandwidth of the PUSCH resource.

In a seventh additional aspect, alone or in combination with one or more of the first through sixth aspects, the sub-band specific SRS resource indicator includes information associating a layer of the PUSCH communication with a subset of the set of SRS resources that comprise a bandwidth that is greater than or equal to a bandwidth of the PUSCH resource.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
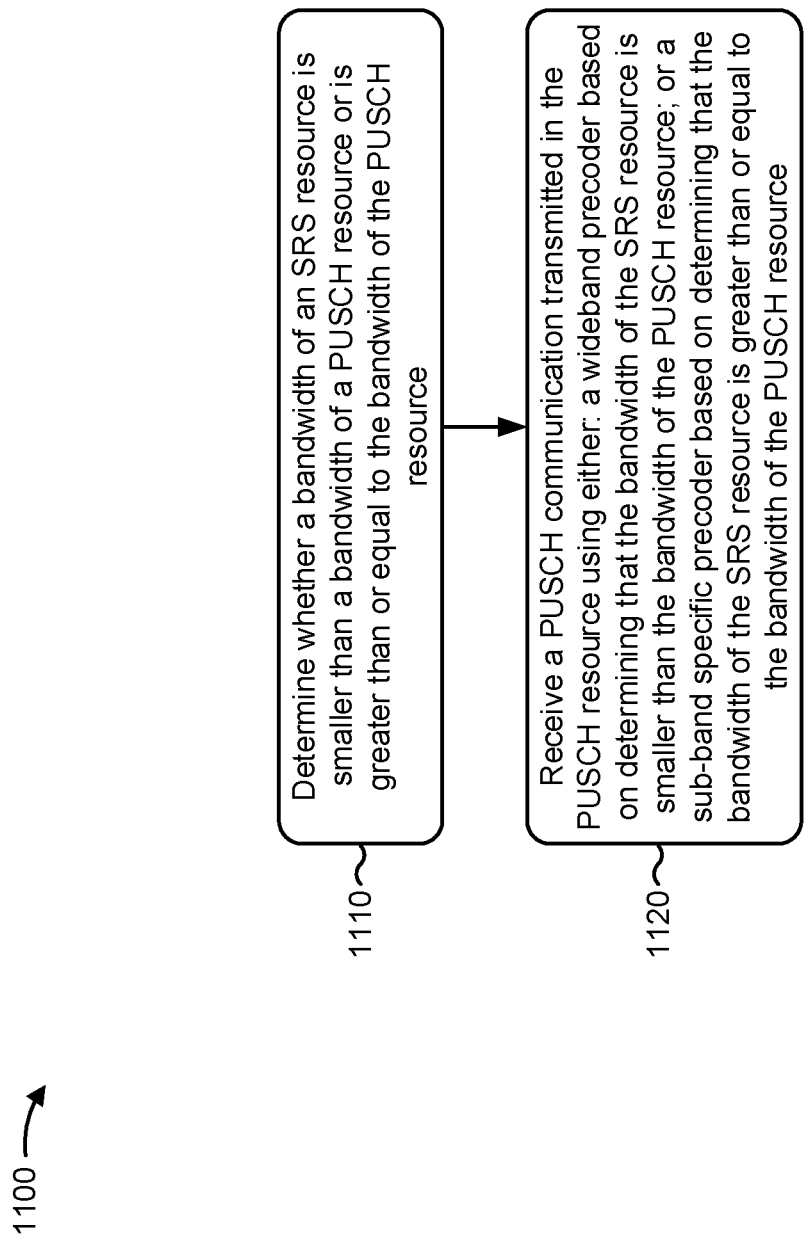
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where a base station (for example, base station 110 among other examples) performs operations associated with sub-band specific SRI indication for NCB-based frequency-selective uplink precoding.

As shown in FIG. 11, in some aspects, process 1100 may include determining whether a bandwidth of an SRS resource is smaller than a bandwidth of a PUSCH resource or is greater than or equal to the bandwidth of the PUSCH resource (block 1110). For example, the base station (for example, using transmit processor 220, receive processor 238, controller/processor 240, memory 242, among other examples) may determine whether a bandwidth of an SRS resource is smaller than a bandwidth of a PUSCH resource or is greater than or equal to the bandwidth of the PUSCH resource, as described above.

As further shown in FIG. 11, in some aspects, process 1100 may include receiving a PUSCH communication, transmitted in the PUSCH resource, using either: a wideband precoder based on determining that the bandwidth of the SRS resource is smaller than the bandwidth of the PUSCH resource; or and a sub-band specific precoder based on determining that the bandwidth of the SRS resource is greater than or equal to the bandwidth of the PUSCH resource (block 1120). For example, the base station (for example, using receive processor 238, controller/processor 240, memory 242, among other examples) may receive a PUSCH communication, transmitted in the PUSCH resource, using either: a wideband precoder based on determining that the bandwidth of the SRS resource is smaller than the bandwidth of the PUSCH resource; or and a sub-band specific precoder based on determining that the bandwidth of the SRS resource is greater than or equal to the bandwidth of the PUSCH resource, as described above.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
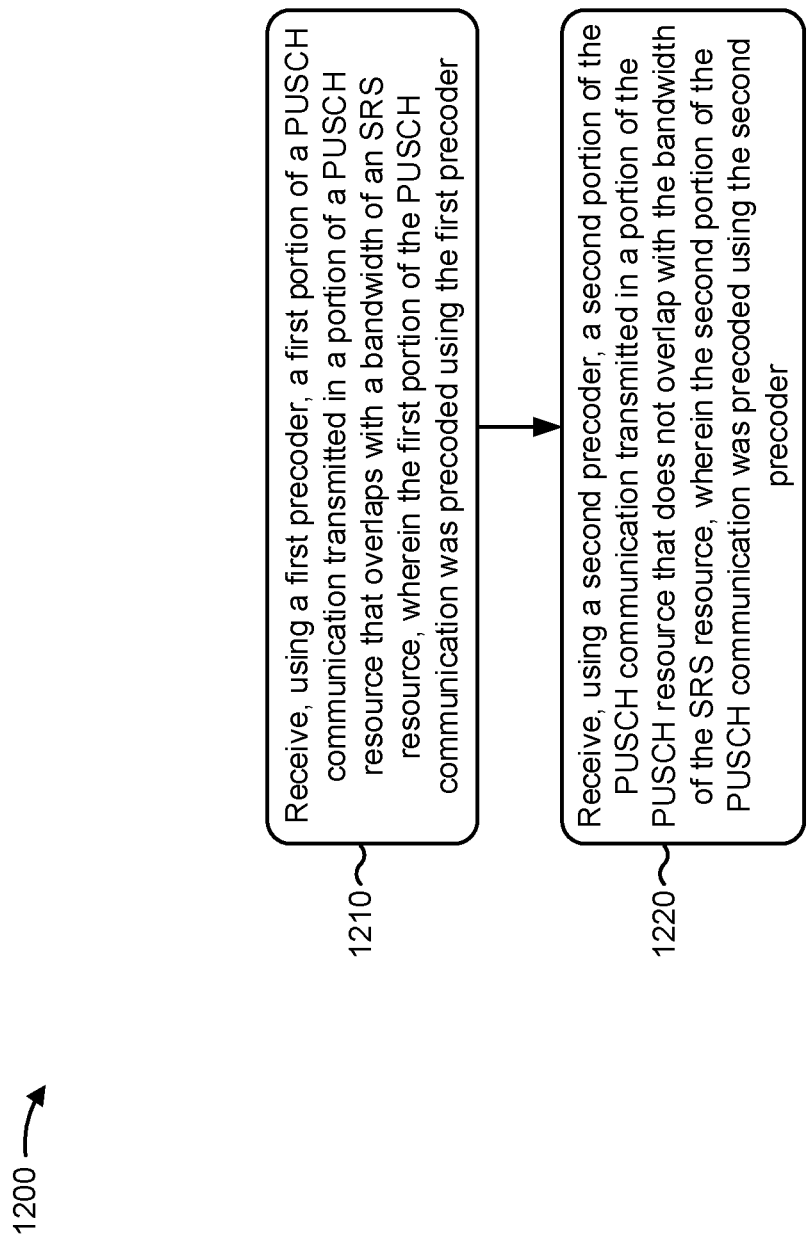
FIG. 12 is a diagram illustrating an example process performed, for example, by a user equipment, in accordance with various aspects of the present disclosure.

FIG. 12 is a diagram illustrating an example process 1200 performed, for example, by a base station, in accordance with various aspects of the present disclosure. Example process 1200 is an example where a base station (for example, base station 110 among other examples) performs operations associated with sub-band specific SRI indication for NCB-based frequency-selective uplink precoding.

As shown in FIG. 12, in some aspects, process 1200 may include receiving, using a first precoder, a first portion of a PUSCH communication transmitted in a portion of a PUSCH resource that overlaps with a bandwidth of an SRS resource, wherein the first portion of the PUSCH communication was precoded using the first precoder (block 1210). For example, the base station (for example, using receive processor 238, controller/processor 240, memory 242, among other examples) may receive, using a first precoder, a first portion of a PUSCH communication transmitted in a portion of a PUSCH resource that overlaps with a bandwidth of an SRS resource, wherein the first portion of the PUSCH communication was precoded using the first precoder, as described above.

As further shown in FIG. 12, in some aspects, process 1200 may include receiving, using a second precoder, a second portion of the PUSCH communication transmitted in a portion of the PUSCH resource that does not overlap with the bandwidth of the SRS resource, wherein the second portion of the PUSCH communication was precoded using the second precoder (block 1220). For example, the base station (for example, using receive processor 238, controller/processor 240, memory 242, among other examples) may receive, using a second precoder, a second portion of the PUSCH communication transmitted in a portion of the PUSCH resource that does not overlap with the bandwidth of the SRS resource, wherein the second portion of the PUSCH communication was precoded using the second precoder, as described above.

Process 1200 may include additional aspects, such as any single aspect or any combination of aspects described below or in connection with one or more other processes described elsewhere herein.

In a first additional aspect, the bandwidth of the SRS resource is smaller than the bandwidth of the PUSCH resource.

In a second additional aspect, alone or in combination with the first aspect, the first precoder is associated with an SRS resource indicator indicated by signaling that scheduled the PUSCH resource.

In a third additional aspect, alone or in combination with one or more of the first and second aspects, the first precoder comprises a plurality of sub-band specific precoders.

In a fourth additional aspect, alone or in combination with one or more of the first through third aspects, the second precoder is a wideband precoder.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
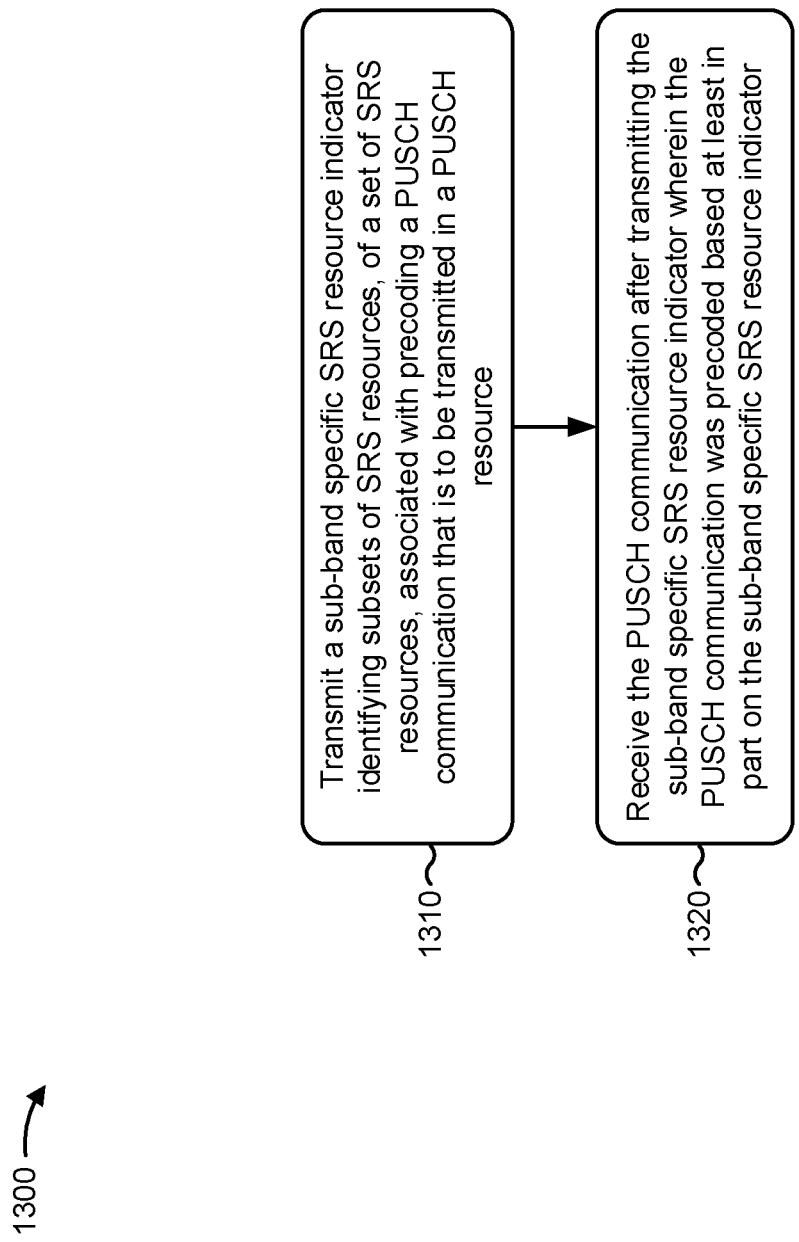
FIG. 13 is a diagram illustrating an example process performed, for example, by a user equipment, in accordance with various aspects of the present disclosure.

FIG. 13 is a diagram illustrating an example process 1300 performed, for example, by a base station, in accordance with various aspects of the present disclosure. Example process 1300 is an example where a base station (for example, base station 110 among other examples) performs operations associated with sub-band specific SRI indication for NCB-based frequency-selective uplink precoding.

As shown in FIG. 13, in some aspects, process 1300 may include transmitting a sub-band specific SRS resource indicator identifying subsets of SRS resources, of a set of SRS resources, associated with precoding a PUSCH communication that is to be transmitted in a PUSCH resource (block 1310). For example, the base station (for example, using transmit processor 220, controller/processor 240, memory 242, among other examples) may transmit a sub-band specific SRS resource indicator identifying subsets of SRS resources, of a set of SRS resources, associated with precoding a PUSCH communication that is to be transmitted in a PUSCH resource, as described above.

As further shown in FIG. 13, in some aspects, process 1300 may include receiving the PUSCH communication after transmitting the sub-band specific SRS resource indicator, wherein the PUSCH communication was precoded based at least in part on the sub-band specific SRS resource indicator (block 1320). For example, the base station (for example, using receive processor 238, controller/processor 240, memory 242, among other examples) may receive the PUSCH communication after transmitting the sub-band specific SRS resource indicator, wherein the PUSCH communication was precoded based at least in part on the sub-band specific SRS resource indicator, as described above.

Process 1300 may include additional aspects, such as any single aspect or any combination of aspects described below or in connection with one or more other processes described elsewhere herein.

In a first additional aspect, a bandwidth of the set of SRS resources is greater than or equal to a bandwidth of the PUSCH resource.

In a second additional aspect, alone or in combination with the first aspect, the sub-band specific SRS resource indicator includes information that identifies a joint rank associated with all sub-bands of the PUSCH resource, and information that identifies a subset of the set of SRS resources for each sub-band of the PUSCH resource.

In a third additional aspect, alone or in combination with one or more of the first and second aspects, the sub-band specific SRS resource indicator includes information that identifies a joint rank and a subset of the set of SRS resources for each sub-band of the PUSCH resource.

In a fourth additional aspect, alone or in combination with one or more of the first through third aspects, the sub-band specific SRS resource indicator includes information that identifies a joint rank associated with all sub-bands of the PUSCH resource, and information that identifies a differential sub-band specific SRS resource indication for each sub-band of the PUSCH resource. In this aspect, the differential sub-band specific SRS resource indication comprises at least one wideband SRS resource indication identifying SRS resources common for all sub-bands and a sub-band specific subset of the set of SRS resources for each sub-band.

In a fifth additional aspect, alone or in combination with one or more of the first through fourth aspects, the sub-band specific SRS resource indicator includes information that identifies a joint rank and a differential sub-band specific SRS resource indication for each sub-band of the PUSCH resource. In this aspect, the differential sub-band specific SRS resource indication comprises at least one wideband SRS resource indication identifying SRS resources common for all sub-bands and a sub-band specific subset of the set of SRS resources for each sub-band.

In a sixth additional aspect, alone or in combination with one or more of the first through fifth aspects, multiple SRS resources, of the set of SRS resources, occupy different frequency resources and comprise a bandwidth that is greater than or equal to a bandwidth of the PUSCH resource.

In a seventh additional aspect, alone or in combination with one or more of the first through sixth aspects, the sub-band specific SRS resource indicator includes information associating a layer of the PUSCH communication with a subset of the set of SRS resources that comprise a bandwidth that is greater than or equal to a bandwidth of the PUSCH resource.

Although FIG. 13 shows example blocks of process 1300, in some aspects, process 1300 may include additional blocks, fewer blocks, different blocks, or differently arranged blocks than those depicted in FIG. 13. Additionally or alternatively, two or more of the blocks of process 1300 may be performed in parallel.

Figure 14:
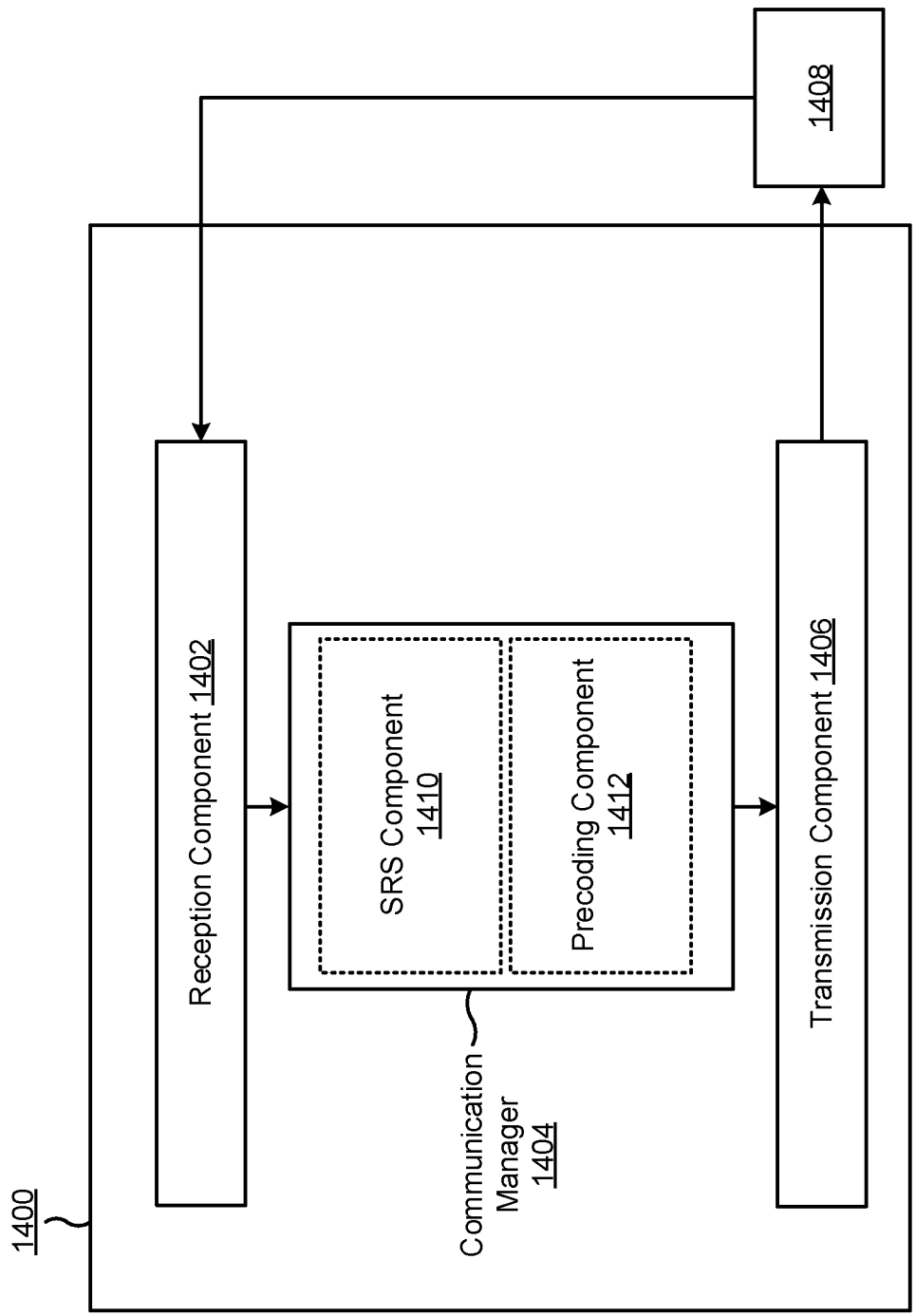
FIGS. 14 and 15 are block diagrams of example apparatuses for wireless communication in accordance with various aspects of the present disclosure.

FIG. 14 is a block diagram of an example apparatus 1400 for wireless communication in accordance with various aspects of the present disclosure. The apparatus 1400 may be a UE, or a UE may include the apparatus 1400. In some aspects, the apparatus 1400 includes a reception component 1402, a communication manager 1404, and a transmission component 1406, which may be in communication with one another (for example, via one or more buses). As shown, the apparatus 1400 may communicate with another apparatus 1408 (such as a UE, a base station, or another wireless communication device) using the reception component 1402 and the transmission component 1406.

In some aspects, the apparatus 1400 may be configured to perform one or more operations described herein in connection with FIGS. 3, 4A-4C, 5, 6A-6C, 7A and 7B. Additionally or alternatively, the apparatus 1400 may be configured to perform one or more processes described herein, such as process 800 of FIG. 8, process 900 of FIG. 9, process 1000 of FIG. 10, or a combination thereof. In some aspects, the apparatus 1400 may include one or more components of the UE described above in connection with FIG. 2.

The reception component 1402 may receive communications, such as reference signals, control information, data communications, or a combination thereof, from the apparatus 1408. The reception component 1402 may provide received communications to one or more other components of the apparatus 1400, such as the communication manager 1404. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a demodulator, a MIMO detector, a receive processor, a controller/processor, a memory, or a combination thereof, of the UE described above in connection with FIG. 2.

The transmission component 1406 may transmit communications, such as reference signals, control information, data communications, or a combination thereof, to the apparatus 1408. In some aspects, the communication manager 1404 may generate communications and may transmit the generated communications to the transmission component 1406 for transmission to the apparatus 1408. In some aspects, the transmission component 1406 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1406 may include one or more antennas, a modulator, a transmit MIMO processor, a transmit processor, a controller/processor, a memory, or a combination thereof, of the UE described above in connection with FIG. 2. In some aspects, the transmission component 1406 may be co-located with the reception component 1402 in a transceiver.

In some aspects, the communication manager 1404 may determine whether a bandwidth of an SRS resource is smaller than a bandwidth of a PUSCH resource or is greater than or equal to the bandwidth of the PUSCH resource. In some aspects, the communication manager 1404 may precode a PUSCH communication that is to be transmitted in the PUSCH resource using either a wideband precoder based on determining that the bandwidth of the SRS resource is smaller than the bandwidth of the PUSCH resource, or a sub-band specific precoder based on determining that the bandwidth of the SRS resource is greater than or equal to the bandwidth of the PUSCH resource. In some aspects, the communication manager 1404 may transmit or may cause the transmission component 1406 to transmit the PUSCH communication after precoding the PUSCH communication.

In some aspects, the communication manager 1404 may precode, using a first precoder, a first portion of a PUSCH communication that is to be transmitted in a portion of a PUSCH resource that overlaps with a bandwidth of an SRS resource. In some aspects, the communication manager 1404 may precode, using a second precoder, a second portion of the PUSCH communication that is to be transmitted in a portion of the PUSCH resource that does not overlap with the bandwidth of the SRS resource. In some aspects, the communication manager 1404 may transmit or may cause the transmission component 1406 to transmit the precoded PUSCH communication (for example) after precoding the first portion of the PUSCH communication and the second portion of the PUSCH communication.

In some aspects, the communication manager 1404 may receive or may cause the reception component 1402 to receive a sub-band specific SRS resource indicator identifying subsets of SRS resources, of a set of SRS resources, associated with precoding a PUSCH communication that is to be transmitted in a PUSCH resource. In some aspects, the communication manager 1404 may precode the PUSCH communication based at least in part on the sub-band specific SRS resource indicator. In some aspects, the communication manager 1404 may transmit or may cause the transmission component 1406 to transmit the PUSCH communication after precoding the PUSCH communication based at least in part on the sub-band specific SRS resource indicator.

In some aspects, the communication manager 1404 may include a controller/processor, a memory, or a combination thereof, of the UE described above in connection with FIG. 2.

In some aspects, the communication manager 1404 may include a set of components, such as an SRS component 1410, a precoding component 1412, or a combination thereof. Alternatively, the set of components may be separate and distinct from the communication manager 1404. In some aspects, one or more components of the set of components may include or may be implemented within a controller/processor, a memory, a scheduler, a communication unit, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the SRS component 1410 may determine whether a bandwidth of an SRS resource is smaller than a bandwidth of a PUSCH resource or is greater than or equal to the bandwidth of the PUSCH resource. In some aspects, the precoding component 1412 may precode a PUSCH communication that is to be transmitted in the PUSCH resource using either a wideband precoder based on determining that the bandwidth of the SRS resource is smaller than the bandwidth of the PUSCH resource, or a sub-band specific precoder based on determining that the bandwidth of the SRS resource is greater than or equal to the bandwidth of the PUSCH resource. In some aspects, the transmission component 1406 may transmit the precoded PUSCH communication.

In some aspects, the precoding component 1412 may precode, using a first precoder, a first portion of a PUSCH communication that is to be transmitted in a portion of a PUSCH resource that overlaps with a bandwidth of an SRS resource. In some aspects, the precoding component 1412 may precode, using a second precoder, a second portion of the PUSCH communication that is to be transmitted in a portion of the PUSCH resource that does not overlap with the bandwidth of the SRS resource. In some aspects, the transmission component 1406 may transmit the PUSCH communication after precoding the first portion of the PUSCH communication and the second portion of the PUSCH communication.

In some aspects, the reception component 1402 may receive a sub-band specific SRS resource indicator identifying subsets of SRS resources, of a set of SRS resources, associated with precoding a PUSCH communication that is to be transmitted in a PUSCH resource. In some aspects, the precoding component 1412 may precode the PUSCH communication based at least in part on the sub-band specific SRS resource indicator. In some aspects, the transmission component 1406 may transmit the PUSCH communication after precoding the PUSCH communication based at least in part on the sub-band specific SRS resource indicator.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
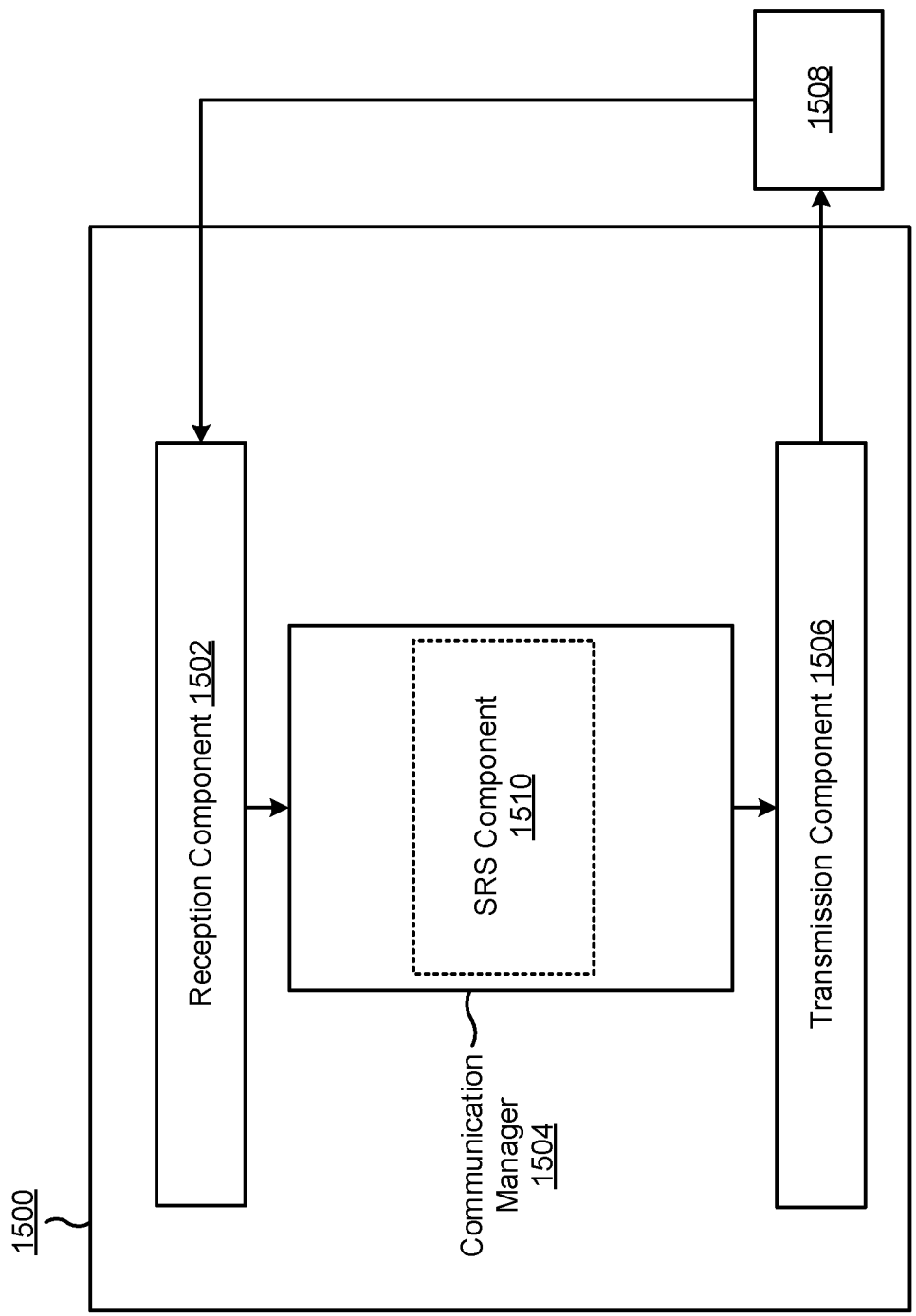

FIG. 15 is a block diagram of an example apparatus 1500 for wireless communication in accordance with various aspects of the present disclosure. The apparatus 1500 may be a base station, or a base station may include the apparatus 1500. In some aspects, the apparatus 1500 includes a reception component 1502, a communication manager 1504, and a transmission component 1506, which may be in communication with one another (for example, via one or more buses). As shown, the apparatus 1500 may communicate with another apparatus 1508 (such as a UE, a base station, or another wireless communication device) using the reception component 1502 and the transmission component 1506.

In some aspects, the apparatus 1500 may be configured to perform one or more operations described herein in connection with FIGS. 3, 4A-4C, 5, 6A-6C, 7A and 7B. Additionally or alternatively, the apparatus 1500 may be configured to perform one or more processes described herein, such as process 1100 of FIG. 11, process 1200 of FIG. 12, process 1300 of FIG. 13, or a combination thereof. In some aspects, the apparatus 1500 may include one or more components of the base station described above in connection with FIG. 2.

The reception component 1502 may receive communications, such as reference signals, control information, data communications, or a combination thereof, from the apparatus 1508. The reception component 1502 may provide received communications to one or more other components of the apparatus 1500, such as the communication manager 1504. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a demodulator, a MIMO detector, a receive processor, a controller/processor, a memory, or a combination thereof, of the base station described above in connection with FIG. 2.

The transmission component 1506 may transmit communications, such as reference signals, control information, data communications, or a combination thereof, to the apparatus 1508. In some aspects, the communication manager 1504 may generate communications and may transmit the generated communications to the transmission component 1506 for transmission to the apparatus 1508. In some aspects, the transmission component 1506 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1506 may include one or more antennas, a modulator, a transmit MIMO processor, a transmit processor, a controller/processor, a memory, or a combination thereof, of the base station described above in connection with FIG. 2. In some aspects, the transmission component 1506 may be co-located with the reception component 1502 in a transceiver.

In some aspects, the communication manager 1504 may determine whether a bandwidth of an SRS resource is smaller than a bandwidth of a PUSCH resource or is greater than or equal to the bandwidth of the PUSCH resource. In some aspects, the communication manager 1504 may receive or may cause the reception component 1502 to receive a PUSCH communication transmitted in the PUSCH resource using either a wideband precoder based on determining that the bandwidth of the SRS resource is smaller than the bandwidth of the PUSCH resource, or a sub-band specific precoder based on determining that the bandwidth of the SRS resource is greater than or equal to the bandwidth of the PUSCH resource.

In some aspects, the communication manager 1504 may receive or may cause the reception component 1502 to receive, using a first precoder, a first portion of a PUSCH communication transmitted in a portion of a PUSCH resource that overlaps with a bandwidth of an SRS resource, wherein the first portion of the PUSCH communication was precoded using the first precoder. In some aspects, the communication manager 1504 may receive or may cause the reception component 1502 to receive, using a second precoder, a second portion of the PUSCH communication transmitted in a portion of the PUSCH resource that does not overlap with the bandwidth of the SRS resource, wherein the second portion of the PUSCH communication was precoded using the second precoder.

In some aspects, the communication manager 1504 may transmit or may cause the transmission component 1506 to transmit a sub-band specific SRS resource indicator identifying subsets of SRS resources, of a set of SRS resources, associated with precoding a PUSCH communication that is to be transmitted in a PUSCH resource. In some aspects, the communication manager 1504 may receive or may cause the reception component 1502 to receive the PUSCH communication after transmitting the sub-band specific SRS resource indicator, wherein the PUSCH communication was precoded based at least in part on the sub-band specific SRS resource indicator.

In some aspects, the communication manager 1504 may include a controller/processor, a memory, a scheduler, a communication unit, or a combination thereof, of the base station described above in connection with FIG. 2.

In some aspects, the communication manager 1504 may include a set of components, such as an SRS component 1510. Alternatively, the set of components may be separate and distinct from the communication manager 1504. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the SRS component 1510 may determine whether a bandwidth of an SRS resource is smaller than a bandwidth of a PUSCH resource or is greater than or equal to the bandwidth of the PUSCH resource. In some aspects, the reception component 1502 may receive a PUSCH communication transmitted in the PUSCH resource using either a wideband precoder based on determining that the bandwidth of the SRS resource is smaller than the bandwidth of the PUSCH resource, or a sub-band specific precoder based on determining that the bandwidth of the SRS resource is greater than or equal to the bandwidth of the PUSCH resource.

In some aspects, the reception component 1502 may receive, using a first precoder, a first portion of a PUSCH communication transmitted in a portion of a PUSCH resource that overlaps with a bandwidth of an SRS resource, wherein the first portion of the PUSCH communication was precoded using the first precoder. In some aspects, the reception component 1502 may receive, using a second precoder, a second portion of the PUSCH communication transmitted in a portion of the PUSCH resource that does not overlap with the bandwidth of the SRS resource, wherein the second portion of the PUSCH communication was precoded using the second precoder.

In some aspects, the transmission component 1506 may transmit a sub-band specific SRS resource indicator identifying subsets of SRS resources, of a set of SRS resources, associated with precoding a PUSCH communication that is to be transmitted in a PUSCH resource. In some aspects, the reception component 1502 may receive the PUSCH communication after transmitting the sub-band specific SRS resource indicator, wherein the PUSCH communication was precoded based at least in part on the sub-band specific SRS resource indicator.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, among other examples.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, among other examples), and may be used interchangeably with "one or more." Where only one item is intended, the phrase "only one" or similar language is used. Also, as used herein, the terms "has," "have," "having," among other examples are intended to be open-ended terms. Further, the phrase "based on" is intended to mean "based, at least in part, on" unless explicitly stated otherwise.

What is claimed is:

1. A method of wireless communication performed by a user equipment, comprising:
    comparing a bandwidth of a sounding reference signal (SRS) resource and a bandwidth of a physical uplink shared channel (PUSCH) resource to determine whether the bandwidth of the SRS resource is smaller than, greater than, or equal to the bandwidth of the PUSCH resource;
    precoding, using a first precoder, a first portion of a PUSCH communication that is to be transmitted in a portion of the PUSCH resource that overlaps with the bandwidth of the SRS resource;
    precoding, using a second precoder, a second portion of the PUSCH communication that is to be transmitted in a portion of the PUSCH resource that does not overlap with the bandwidth of the SRS resource; and
    transmitting a precoded PUSCH communication that comprises the first portion and the second portion.

2. The method of claim 1, wherein the bandwidth of the SRS resource is smaller than the bandwidth of the PUSCH resource.

3. The method of claim 1, wherein the first precoder is associated with an SRS resource indicator indicated by signaling that scheduled the PUSCH resource.

4. The method of claim 1, wherein the first precoder comprises a plurality of sub-band specific precoders.

5. The method of claim 1, wherein the second precoder is a wideband precoder.

6. A method of wireless communication performed by a user equipment, comprising:
    receiving a sub-band specific sounding reference signal (SRS) resource indicator identifying subsets of SRS resources, of a set of SRS resources, associated with precoding a physical uplink shared channel (PUSCH) communication that is to be transmitted in a PUSCH resource;
    comparing a bandwidth of the set of SRS resources and a bandwidth of the PUSCH resource to determine whether the bandwidth of the SRS resource is smaller than, greater than, or equal to the bandwidth of the PUSCH resource;
    precoding the PUSCH communication based at least in part on the sub-band specific SRS resource indicator; and
    transmitting the precoded PUSCH communication.

7. The method of claim 6, wherein the bandwidth of the set of SRS resources is greater than or equal to the bandwidth of the PUSCH resource.

8. The method of claim 6, wherein the sub-band specific SRS resource indicator includes information that identifies a joint rank associated with all sub-bands of the PUSCH resource, and information that identifies a subset of the set of SRS resources for each sub-band of the PUSCH resource.

9. The method of claim 6, wherein the sub-band specific SRS resource indicator includes information that identifies a joint rank and a subset of the set of SRS resources for each sub-band of the PUSCH resource.

10. The method of claim 6, wherein the sub-band specific SRS resource indicator includes information that identifies a joint rank associated with all sub-bands of the PUSCH resource, and information that identifies a differential sub-band specific SRS resource indication for each sub-band of the PUSCH resource, wherein the differential sub-band specific SRS resource indication comprises at least one wideband SRS resource indication identifying SRS resources common for the all sub-bands and a sub-band specific subset of the set of SRS resources for the each sub-band.

11. The method of claim 6, wherein the sub-band specific SRS resource indicator includes information that identifies a joint rank and a differential sub-band specific SRS resource indication for each sub-band of the PUSCH resource, wherein the differential sub-band specific SRS resource indication comprises at least one wideband SRS resource indication identifying SRS resources common for all sub-bands and a sub-band specific subset of the set of SRS resources for the each sub-band.

12. The method of claim 6, wherein multiple SRS resources, of the set of SRS resources, occupy different frequency resources and comprise a bandwidth that is greater than or equal to the bandwidth of the PUSCH resource.

13. The method of claim 6, wherein the sub-band specific SRS resource indicator includes information associating a layer of the PUSCH communication with a subset of the set of SRS resources that comprise a bandwidth that is greater than or equal to the bandwidth of the PUSCH resource.

14. A user equipment, comprising:
one or more memories; and
one or more processors communicatively coupled to the one or more memories, configured to:
  determine whether a bandwidth of a sounding reference signal (SRS) resource is smaller than a bandwidth of a physical uplink shared channel (PUSCH) resource or is greater than or equal to the bandwidth of the PUSCH resource;
  precode a PUSCH communication that is to be transmitted in the PUSCH resource using either:
    a wideband precoder based on determining that the bandwidth of the SRS resource is smaller than the bandwidth of the PUSCH resource;
    or a sub-band specific precoder based on determining that the bandwidth of the SRS resource is greater than or equal to the bandwidth of the PUSCH resource; and
  transmit the precoded PUSCH communication.

15. A user equipment (UE), comprising:
one or more memories; and
one or more processors communicatively coupled to the one or more memories, configured to:
  compare a bandwidth of a sounding reference signal (SRS) resource and a bandwidth of a physical uplink shared channel (PUSCH) resource to determine whether the bandwidth of the SRS resource is smaller than, greater than, or equal to the bandwidth of the PUSCH resource;
  precode, using a first precoder, a first portion of a PUSCH communication that is to be transmitted in a portion of the PUSCH resource that overlaps with the bandwidth of the SRS resource;
  precode, using a second precoder, a second portion of the PUSCH communication that is to be transmitted in a portion of the PUSCH resource that does not overlap with the bandwidth of the SRS resource; and
  transmit a precoded PUSCH communication that comprises the first portion and the second portion.

16. The UE of claim 15, wherein the bandwidth of the SRS resource is smaller than the bandwidth of the PUSCH resource.

17. The UE of claim 15, wherein the first precoder is associated with an SRS resource indicator indicated by signaling that scheduled the PUSCH resource.

18. The UE of claim 15, wherein the first precoder comprises a plurality of sub-band specific precoders.

19. The UE of claim 15, wherein the second precoder is a wideband precoder.

20. An apparatus, comprising:
means for comparing a bandwidth of a sounding reference signal (SRS) resource and a bandwidth of a physical uplink shared channel (PUSCH) resource to determine whether the bandwidth of the SRS resource is smaller than, greater than, or equal to the bandwidth of the PUSCH resource;
means for precoding, using a first precoder, a first portion of a PUSCH communication that is to be transmitted in a portion of the PUSCH resource that overlaps with the bandwidth of a sounding reference signal (SRS) the SRS resource;
means for precoding, using a second precoder, a second portion of the PUSCH communication that is to be transmitted in a portion of the PUSCH resource that does not overlap with the bandwidth of the SRS resource; and
means for transmitting a precoded PUSCH communication that comprises the first portion and the second portion.

21. The apparatus of claim 20, wherein the bandwidth of the SRS resource is smaller than the bandwidth of the PUSCH resource.

22. The apparatus of claim 20, wherein the first precoder is associated with an SRS resource indicator indicated by signaling that scheduled the PUSCH resource.

23. The apparatus of claim 20, wherein the first precoder comprises a plurality of sub-band specific precoders.

24. The apparatus of claim 20, wherein the second precoder is a wideband precoder.

* * * * *